United States Patent
Stachurski et al.

(10) Patent No.: US 10,616,587 B2
(45) Date of Patent: Apr. 7, 2020

(54) BIT RATE CONTROL OVER GROUPS OF FRAMES

(71) Applicant: DTS, Inc., Calabasas, CA (US)

(72) Inventors: Jacek Stachurski, Woodland Hills, CA (US); Zoran Fejzo, Los Angeles, CA (US)

(73) Assignee: DTS, Inc., Calabasas, CA (US)

( * ) Notice: Subject to any disclaimer, the term of this patent is extended or adjusted under 35 U.S.C. 154(b) by 18 days.

(21) Appl. No.: 15/963,747

(22) Filed: Apr. 26, 2018

(65) Prior Publication Data

US 2018/0316923 A1    Nov. 1, 2018

Related U.S. Application Data

(60) Provisional application No. 62/490,165, filed on Apr. 26, 2017.

(51) Int. Cl.

| | |
|---|---|
| *H04L 12/835* | (2013.01) |
| *H04L 12/851* | (2013.01) |
| *H04N 7/50* | (2006.01) |
| *G06T 9/00* | (2006.01) |
| *G10L 19/008* | (2013.01) |
| *H04N 19/152* | (2014.01) |

(Continued)

(52) U.S. Cl.
CPC ......... *H04N 19/152* (2014.11); *G10L 19/002* (2013.01); *H04L 65/607* (2013.01)

(58) Field of Classification Search
CPC ..... G10L 19/002; H04N 19/152; H04L 47/30; H04L 47/24; H04L 65/602; H04L 65/80; H04L 47/10; H04L 65/607

See application file for complete search history.

(56) References Cited

U.S. PATENT DOCUMENTS

| | | |
|---|---|---|
| 5,617,145 A | 4/1997 | Huang et al. |
| 5,623,424 A | 4/1997 | Azadegan et al. |

(Continued)

FOREIGN PATENT DOCUMENTS

WO    WO-2018200822 A1    11/2018

OTHER PUBLICATIONS

"International Application Serial No. PCT/US2018/029584, International Search Report dated Jul. 10, 2018", 2 pgs.

(Continued)

*Primary Examiner* — Alison Slater
(74) *Attorney, Agent, or Firm* — Schwegman Lundberg & Woessner, P.A.

(57) ABSTRACT

Systems and methods are described for processing data from a sequential series of groups of frames to achieve a target average processing bit rate for a particular group of frames in the series. In an example, a look-ahead buffer circuit can be populated with a number of frames from a particular group of frames, and a bit allocation can be determined for a frame in the look-ahead buffer circuit using bit request information about all of the frames in the buffer. The look-ahead buffer circuit can be populated with streaming frame information in a first-in-first-out manner, and bit allocation processing can be performed for each frame, in a particular group of frames, based on a frame position in the look-ahead buffer circuit and further based on bit requests associated with other frames in the look-ahead buffer circuit.

20 Claims, 10 Drawing Sheets

(51) Int. Cl.
H04L 29/06 (2006.01)
G10L 19/002 (2013.01)

(56) References Cited

U.S. PATENT DOCUMENTS

| | | | |
|---|---|---|---|
| 5,644,310 | A | 7/1997 | Laczki et al. |
| 5,719,632 | A | 2/1998 | Hoang et al. |
| 6,167,496 | A | 12/2000 | Fechner |
| 6,952,677 | B1 | 10/2005 | Absar |
| 2005/0015259 | A1 | 1/2005 | Thumpudi et al. |
| 2006/0224762 | A1 | 10/2006 | Tian et al. |
| 2007/0121678 | A1 | 5/2007 | Brooks et al. |
| 2010/0146145 | A1 | 6/2010 | Tippin et al. |
| 2012/0269258 | A1 | 10/2012 | Yang et al. |
| 2013/0329809 | A1 | 12/2013 | Leontaris et al. |
| 2014/0328384 | A1* | 11/2014 | Novotny ......... H04N 21/23655 375/240.02 |
| 2016/0225377 | A1* | 8/2016 | Miyasaka ............. G10L 19/008 |
| 2017/0063692 | A1* | 3/2017 | Roncero Izquierdo ..................... H04L 47/12 |
| 2017/0063959 | A1* | 3/2017 | Roncero Izquierdo ..................... H04L 65/607 |

OTHER PUBLICATIONS

"International Application Serial No. PCT/US2018/029584, Written Opinion dated Jul. 10, 2018", 9 pgs.
"International Application Serial No. PCT/US2018/029584, International Preliminary Report on Patentability dated Nov. 7, 2019", 11 pgs.

* cited by examiner

US 10,616,587 B2

BIT RATE CONTROL OVER GROUPS OF FRAMES

CLAIM OF PRIORITY

This patent application claims the benefit of priority to U.S. Provisional Patent Application No. 62/490,165, filed on Apr. 26, 2017, which is incorporated by reference herein in its entirety.

BACKGROUND

Variable bit rate codecs can include devices, instructions, or computer-implemented programs that can compress data, such as to enable greater throughput of information transfer over a network, and can decompress data for use or further processing. In an example, a variable bit rate codec may not guarantee a specified bit rate, or average bit rate, over a group of frames. In some examples, other frame processing is provided to sever frames, or bit packets, into smaller discrete parts such that the parts can fit within a specified average bit rate target, such as for a given audio or video segment. However, such packetizing can be undesirable since it increases a processing load.

In some examples, a bit reservoir can be used to limit an overall bit rate fluctuation. The bit reservoir can be employed to constrain variation of per-frame bit allocations, such as to one frame of bit payload. The bit reservoir approach, however, has several drawbacks One is that there is no guarantee of satisfying a target average bit rate over a group of frames. Another is that one frame may deplete the reservoir and then the next may receive fewer bits than is desired for sufficiently encoding the information in the frame. This can be especially problematic when fewer bits are available to encode present information, when the present information is perceptually more important than information that precedes or follows the present information.

OVERVIEW

The present inventors have recognized that a problem to be solved includes providing a specified bit rate, or average bit rate, over a group of frames, such as for an audio, video, or other data processor or codec. In an example, the problem can include guaranteeing a specified average bit rate without a dedicated bit reservoir. In an example, the problem includes managing bit requests to encode serially-arriving, frame-based data without prior knowledge about the contents of an entire group of frames or larger data packet.

A solution to the above-described problem can include or use a look-ahead processing buffer or buffer circuit for receiving multiple bit requests corresponding to frames in a particular group of frames, such as a first group of frames F1. The respective bit requests for each frame in the particular group of frames can include or can be associated with various constraints, such as a minimum or maximum bit rate, a relative importance (e.g., a perceptual importance), or other constraint or characteristic. In an example, a first set of frames from the first group of frames F1 can populate the look-ahead processing buffer, and the bit requests associated with the first set can be processed or analyzed together by a processor circuit to determine how to best allocate available bits to one or more frames in the look-ahead processing buffer based on the constraints. In an example, a processor circuit allocates bits to an earliest-received frame in the first set of frames, and then the look-ahead processing buffer is updated in a first-in-first-out manner to purge the earliest-received frame and include a later-received frame. The processor can then analyze the bit requests corresponding to the updated look-ahead processing buffer to allocate bits to one or more frames in the updated buffer. In an example, a boundary, frame count, or other information about a group of frames need not be known a priori and, in some examples, can change over the course of processing to achieve a specified target or average bit rate, such as using the systems and methods discussed herein.

In an example, a problem can include determining how to apply audio or video compression to frame-based audio or video data while minimizing a perception of artifacts or distortion when the audio or video information is later extracted or decompressed for use or further processing. The present inventors have recognized that a solution to the problem can include considering inherent limitations of human hearing or vision, and adjusting codec bit allocations based on such limitations, such as while satisfying a target or average bit rate constraint.

This overview is intended to provide a summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description that includes examples of systems, methods, and devices for processing data from a sequential series of groups of frames, such as for encoding or decoding audio, video, or other data signals, reference is made to the accompanying drawings, which form a part of the detailed description. The drawings show, by way of illustration, specific embodiments in which the inventions disclosed herein can be practiced. These embodiments are generally referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

Signals having a variable bit rate (VBR) are used in audio, video, telecommunications, computing, and other signal processing. As contrasted with a constant bit rate (CBR) signal, a VBR signal can vary an amount or quantity of bits or data for a given period or time segment. In an example, a VBR signal can allocate a relatively greater bit rate to more complicated or information-heavy portions of a signal, and can allocate a relatively lesser bit rate to less complicated or less essential portions. However, it can be desirable to maintain a specified average bit rate (or average range of bit rates) for a particular signal or file. Some examples of formats that use variable bit rate encoding include MP3, WMA, and AAC audio file formats, or MPEG-2, MPEG-4, and Dirac video file formats.

Using VBR provides several advantages over CBR. For example, with VBR encoding, a better quality-to-space ratio can be achieved for a given data segment. In VBR, available bits can be allocated more flexibly or variably, to thereby enable more accurate encoding of sound or video information. For example, fewer bits can be allocated to frames or segments that require less resolution, and a greater number of bits can be allocated to frames or segments that are more critical or perceptible.

Variable bit rate processing, however, is not without its disadvantages. For example, VBR processing can be more computationally and time intensive to encode than CBR. Variable bit rate processing can introduce various problems when used with streaming data, such as when an instantaneous bit rate exceeds a data rate of a communication path. Such problems, however, can be mitigated by limiting an instantaneous bit rate or maximum bit rate during encoding or by increasing a bit reservoir size or buffer size.

Figure 1:
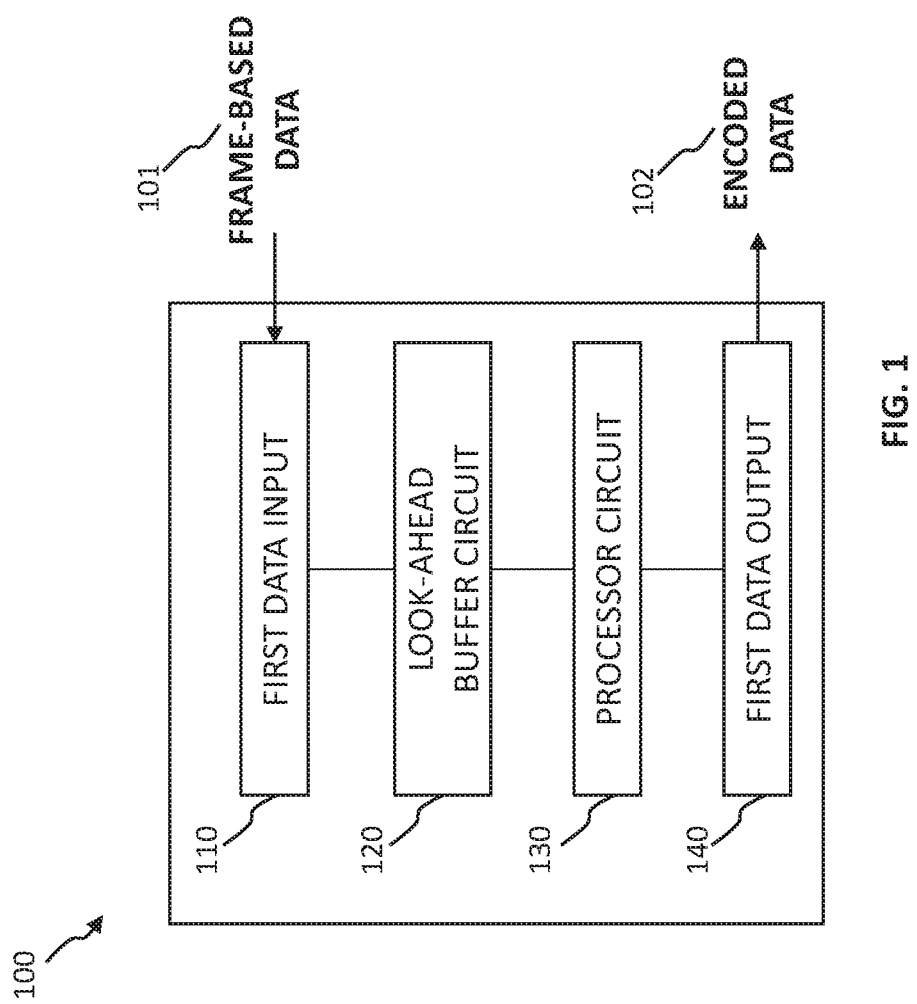
FIG. 1 illustrates generally an example of a system that can include or use a processing arrangement for frame-based data.

FIG. 1 illustrates generally an example of a system that can include or use a processing arrangement 100 for frame-based data. The processing arrangement 100 can be configured to process received data to achieve a target average processing bit rate. In an example, the processing arrangement 100 receives frame-based data 101 at a first data input 110 and provides encoded data 102 from a first data output 140. The frame-based data 101 can include, for example, a sequential series of groups of frames. The groups of frames can represent various kinds of data, such as audio, video, or other data or signals that can be discretized or segmented into frames. In an example, each frame or each group of frames can include header or metadata information that can include or influence constraints associated with the particular frame's (or group of frames') payload. For example, constraints can include a minimum bit rate, a maximum or instantaneous bit rate, an indication of a relative perceptual importance, or other type of constraint or limitation about the payload of a frame. In an example, metadata associated with a frame or with a group of frames can include mandatory data that cannot be compressed or removed, and thus can consume a portion of a minimum bit rate, leaving less bandwidth for a payload. Metadata itself can be variable in size, and can vary from frame to frame, or can vary among groups of frames. In an example, the frame-based data 101 includes a stream of audio and/or video data, such as can be distributed using a network.

In an example, at least a portion of the frame-based data 101 can be received in a look-ahead buffer circuit 120. The look-ahead buffer circuit 120 can include any number of memory locations for frames of the same size or frames having different sizes. In an example, the frame-based data 101 includes a series of groups of frames, and each group of frames can have the same or different number of frames. In an example, a number of memory locations for discrete frames in the look-ahead buffer circuit 120 is less than a number of frames in a particular group of frames.

The look-ahead buffer circuit 120 can be coupled to a processor circuit 130. The look-ahead buffer circuit 120 can be configured to store, or the processor circuit 130 can be configured to access, bit request information associated with frames in the look-ahead buffer circuit 120. The processor circuit 130 can be further configured to analyze together bit request information for all frames in the look-ahead buffer circuit 120 to determine a bit allocation for a particular one of the frames in the look-ahead buffer circuit 120. In an example, the same processor circuit 130, or a different processor circuit or device, can be used to encode or process the particular one of the frames for which the bit allocation was determined. That is, the processor circuit 130 can provide, at the first data output 140, one or more of a bit allocation determination for a particular frame, or can provide the encoded data 102, such as can include an encoded or otherwise processed version of the particular frame. One or more other buffer circuits, memory circuits, or processor circuits can be included or used in the processing arrangement 100 for carrying out the storage and analysis of frames as described herein. The bit requests associated with, or corresponding to, the discrete frames can be provided without other information or a priori knowledge of any constraints on the system that is ultimately tasked with processing or transmitting the frames. The processor circuit 130 can be configured to adjust or control how bits get allocated, such as over a group of frames, to meet or maintain a specified average bit rate or to satisfy other constraints.

FIGS. 2-8 illustrate generally examples that include using the processing arrangement 100 to perform an encoding process on the frame-based data 101. In the examples, the frame-based data 101 includes various groups of frames that can arrive sequentially at the first data input 110. Portions of the frame-based data 101 can be stored in the look-ahead buffer circuit 120 and/or can be operated on by the processor circuit 130. In the figures and throughout this specification, the groups of frames are designated Fn, such as F1, F2, F3, etc., with F1 arriving earliest, F2 following F1, F3 following F2, and so on. Each group of frames includes a number of discrete frames Dj, and the particular number of discrete frames can vary among the groups of frames. Each group of frames Fn includes discrete frames $Fn_0$ through $Fn_{Dj}$. Although the groups of frames Fn and discrete frames are generally discussed herein as arriving in series or in a time-dependent manner, the various encoding and processing methods discussed herein can similarly be applied when frame-based data is available together rather than serially, such as together in a memory circuit or bit reservoir.

Figure 2:
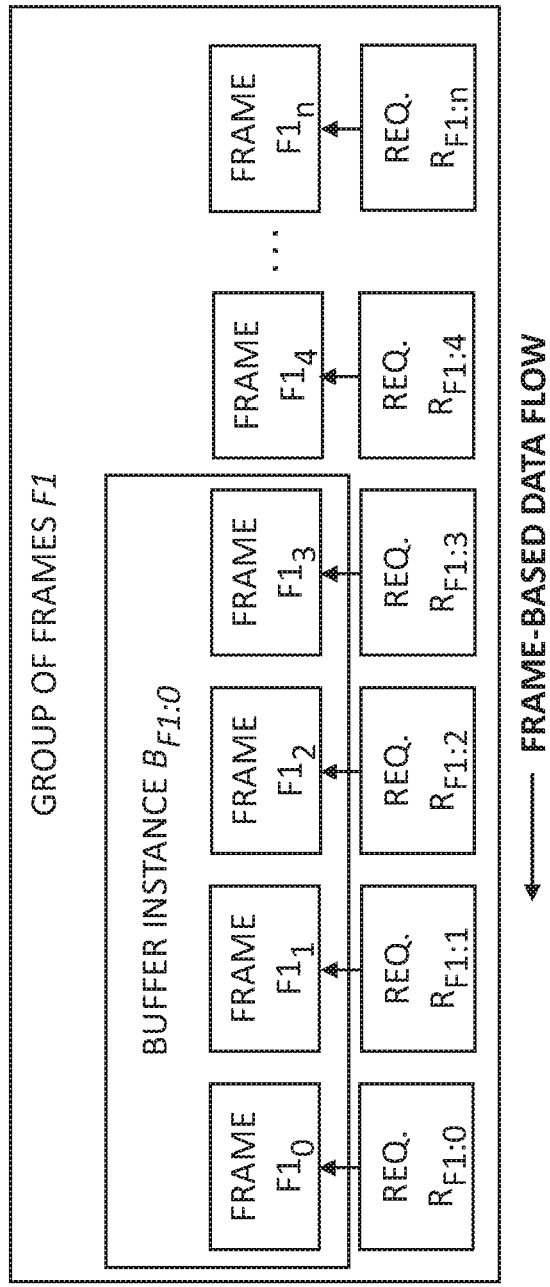
FIG. 2 illustrates generally an example of a first group of frames F1 that includes n frames.

FIG. 2 illustrates generally an example of a first group of frames F1 that includes n frames. In the example, the first group of frames F1 includes discrete frames $F1_0$, $F1_1$, $F1_2$, ... $F1_n$. In this example, each of the discrete frames is associated with or corresponds to a respective bit request $R_{Fn:0}$ through $R_{Fn:Dj}$. The respective bit requests can be unique to the frames in the example as illustrated, however, in other examples, bit requests can be differently distributed. For example, a bit request associated with a particular frame can include or provide bit request information for multiple other frames in the same or different group of frames.

The example of FIG. 2 includes a first buffer instance $B_{F1:0}$ for the look-ahead buffer circuit 120. A buffer instance, as used herein, refers to a state of the look-ahead buffer circuit 120 wherein a particular number of memory locations available in the look-ahead buffer circuit 120 are occupied or unoccupied by particular frames. In other words, the first buffer instance $B_{F1:0}$ refers to a state of the look-ahead buffer circuit 120 when first through fourth frames $F1_0$, $F1_1$, $F1_2$, and $F1_3$, are stored in or are available to the look-ahead buffer circuit 120. If the look-ahead buffer circuit 120 included any fewer frames or other frames, then a different buffer instance would be indicated.

In the example of FIG. 2, for ease of illustrating the processing and frame-handling techniques described herein, the look-ahead buffer circuit 120 includes four memory locations. Additional or fewer memory locations can similarly be used. In the example of FIG. 2, each of the four memory locations in the look-ahead buffer circuit 120 is occupied. Therefore, the look-ahead buffer circuit 120 can be considered full and the processor circuit 130 can receive the bit requests $R_{F1:0}$ through $R_{F1:3}$ corresponding to the frames in the look-ahead buffer circuit 120. In the several FIGS. 2 through 8, request is abbreviated as "REQ." Based on the information in the several bit requests $R_{F1:0}$ through $R_{F1:3}$, the processor circuit 130 can determine how to allocate available bits among one or more of the corresponding frames $F1_0$, $F1_1$, $F1_2$, and $F1_3$. In an example, the processor circuit 130 is configured to determine a bit allocation for the earliest-received frame (e.g., frame $F1_0$, in the example of FIG. 2) in the look-ahead buffer circuit 120 based on the information in the bit requests $R_{F1:0}$ through $R_{F1:3}$. In other words, the processor circuit 130 can use information or bit requests associated with the multiple frames in the look-ahead buffer circuit 120 to determine or provide a bit allocation for one particular frame in the look-ahead buffer circuit 120. The determined bit allocation can then be applied, such as using the same or different processor circuit 130, to encode the particular frame.

Figure 3:
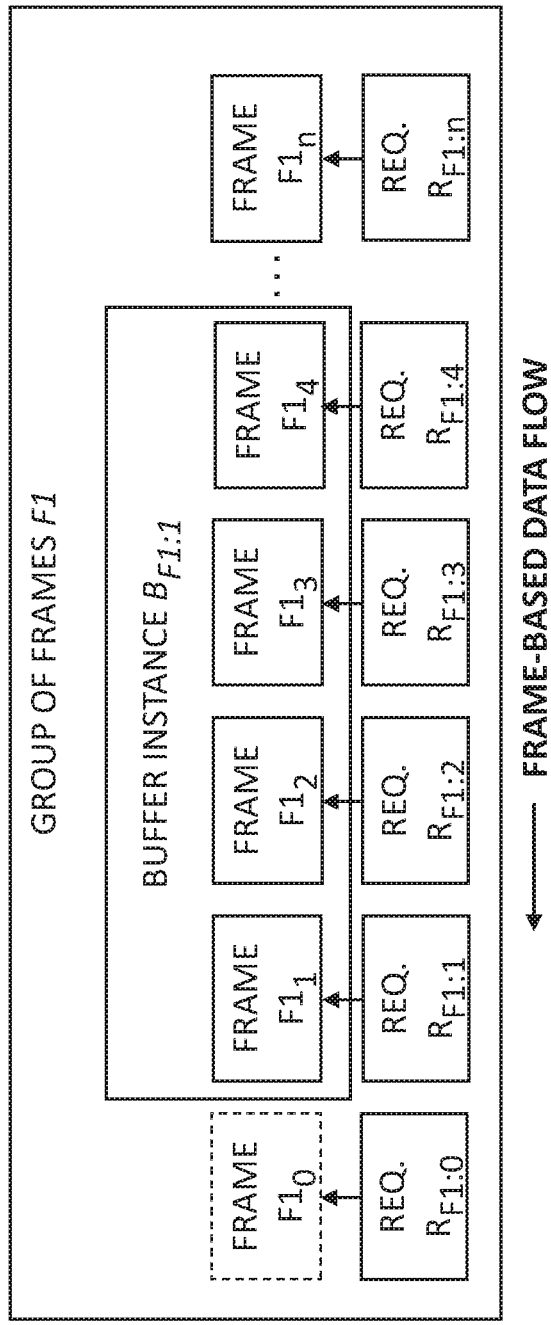
FIG. 3 illustrates generally an example of the first group of frames F1 and a buffer instance for a look-ahead buffer circuit.

FIG. 3 illustrates generally an example of the first group of frames F1 and a subsequent buffer instance $B_{F1:1}$ for the look-ahead buffer circuit 120. In the example of FIG. 3, frame $F1_0$ is purged from the look-ahead buffer circuit 120, and the subsequent buffer instance $B_{F1:1}$ includes frames $F1_1$ through $F1_4$. That is, an earliest-received frame in the subsequent buffer instance $B_{F1:1}$ is frame $F1_1$. The representation of the frame $F1_0$ in the example includes a dashed-line border to indicate that the frame $F1_0$ is already processed or encoded. A bit request corresponding to the frame $F1_0$ can thus be disregarded for processing or encoding of further or later-received frames in the first group F1. In an example, rather than considering frame $F1_0$ as purged from the look-ahead buffer circuit 120, a look-ahead window corresponding to the look-ahead buffer circuit 120 can be understood to have moved sequentially along the frames in the first group of frames F1.

In the example of FIG. 3, based on the information in the several bit requests $R_{F1:1}$ through $R_{F1:4}$, such as corresponding respectively to the frames $F1_1$ through $F1_4$, the processor circuit 130 can determine how to allocate available bits among one or more of the corresponding frames $F1_1$, $F1_2$, $F1_3$, and $F1_4$. In an example, the processor circuit 130 is configured to determine a bit allocation for an earliest-received frame $F1_1$ in the example of FIG. 3) presently in the look-ahead buffer circuit 120, such as based on the information in the bit requests $R_{F1:1}$ through $R_{F1:4}$ corresponding to the frames in the present buffer instance $B_{F1:1}$.

Figure 4:
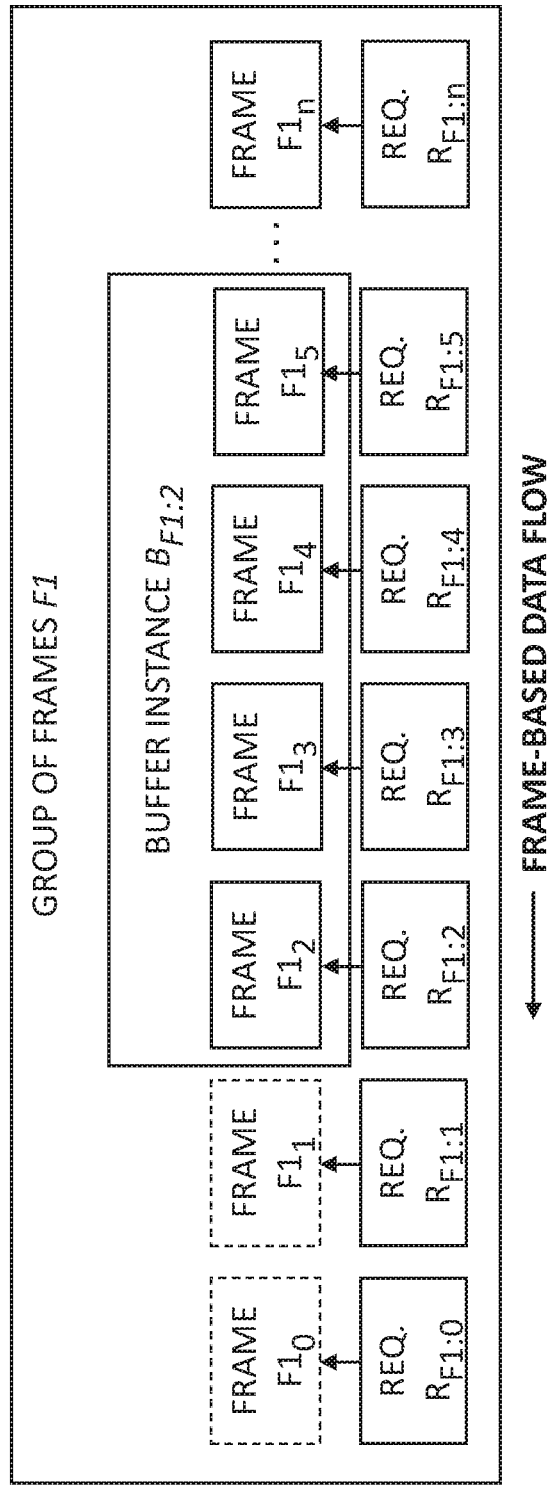
FIG. 4 illustrates generally an example of the first group of frames F1 and a subsequent buffer instance for the look-ahead buffer circuit.

FIG. 4 illustrates generally an example of the first group of frames F1 and a further subsequent buffer instance $B_{F1:2}$ for the look-ahead buffer circuit 120. In the example of FIG. 4, frame $F1_1$ is purged from the look-ahead buffer circuit 120 (or the look-ahead window corresponding to the look-ahead buffer circuit 120 is moved), and the further subsequent buffer instance $B_{F1:2}$ includes frames $F1_2$ through $F1_5$. That is, an earliest-received frame in the further subsequent buffer instance $B_{F1:2}$ is frame $F1_2$ and a most recently-received frame in the further subsequent buffer instance $B_{F1:2}$ is frame $F1_5$. The representation of the preceding frames $F1_0$ and $F1_1$ in the example are include a dashed-line border to indicate that the frames $F1_0$ and $F1_1$ are already processed or encoded. The bit requests corresponding to the frames $F1_0$ and $F1_1$ can thus be disregarded for processing or encoding of further or later-received frames in the first group of frames F1.

In the example of FIG. 4, based on the information in the several bit requests $R_{F1:2}$ through $R_{F1:5}$, such as corresponding respectively to the frames $F1_2$ through $F1_5$, the processor circuit 130 can determine how to allocate available bits among one or more of the corresponding frames $F1_2$, $F1_3$, $F1_4$, and $F1_5$. In an example, the processor circuit 130 is configured to determine a bit allocation for an earliest-received frame (e.g., frame $F1_2$ in the example of FIG. 4) presently in the took-ahead buffer circuit 120, such as based on the information in the bit requests $R_{F1:2}$ through $R_{F1:5}$ corresponding to the frames in the present buffer instance $B_{F1:2}$. Once the bit allocation is determined, the same or different processor circuit 130 can encode the earliest-received frame $F1_2$ according to the allocation as-determined.

Figure 5:
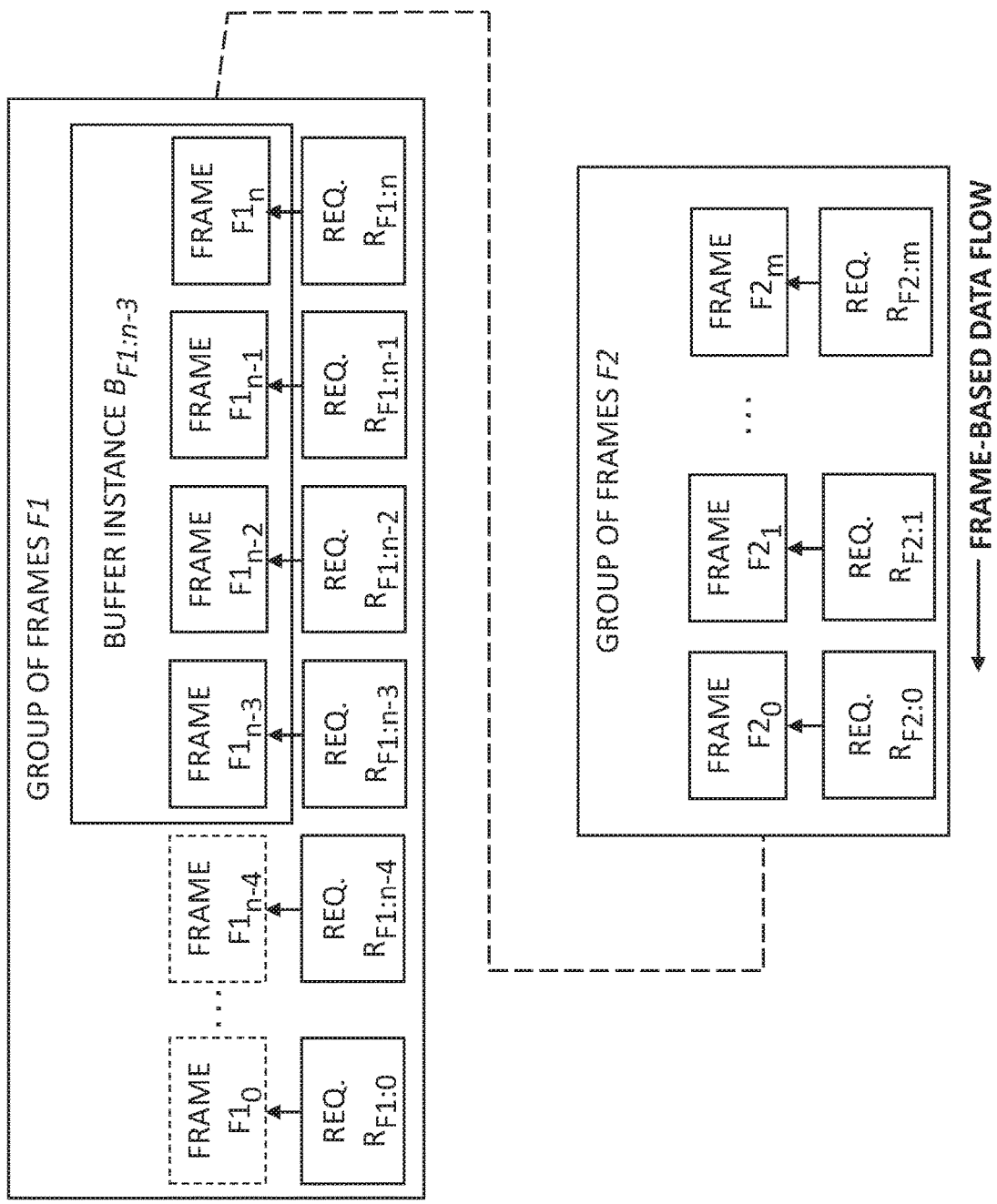
FIG. 5 illustrates generally an example of the first group of frames F1 and a further subsequent buffer instance for the look-ahead buffer circuit.

FIG. 5 illustrates generally an example of the first group of frames F1 and a further subsequent buffer instance $B_{F1:n-3}$ for the look-ahead buffer circuit 120. That is, for the case where the first group of frames F1 includes n frames, the example of FIG. 5 corresponds to the look-ahead buffer circuit 120 being fully occupied by the last four frames in the first group of frames F1. In the example of FIG. 5, frame $F1_{n-4}$ is purged from the look-ahead buffer circuit 120 (or the look-ahead window corresponding to the look-ahead buffer circuit 120 is moved), and the further subsequent buffer instance $B_{F1:n-3}$ includes frames $F1_{n-3}$ through $F1_n$. That is, an earliest-received frame in the subsequent buffer instance $B_{F1:n-3}$ is frame $F1_{n-3}$ and a most recently-received frame in the subsequent buffer instance $B_{F1:n-3}$ is frame $F1_n$, in this case, corresponding to the final frame in the first group of frames F1. The representation of the preceding frames $F1_0$ through $F1_{n-4}$ in the example include a dashed-line border to indicate that the frames are already processed or encoded, and the bit requests corresponding to the frames $F1_0$ through $F1_{n-4}$ can thus be disregarded for processing or encoding of further frames in the first group of frames F1.

Based on the information in the several bit requests $R_{F1:n-3}$ through $R_{F1:n}$, such as corresponding respectively to the frames $F1_{n-3}$ through $F1_n$, the processor circuit 130 can determine how to allocate available bits among one or more of the corresponding frames $F1_{n-3}$, $F1_{n-2}$, $F1_{n-1}$, and $F1_n$. In an example, the processor circuit 130 is configured to determine a bit allocation for the earliest-received frame (e.g., frame $F1_{n-3}$ in the example of FIG. 5) presently in the look-ahead buffer circuit 120, such as based on the information in the bit requests $R_{F1:n-3}$ through $R_{F1:n}$ corresponding to the frames in the present buffer instance $B_{F1:n-3}$. Once the bit allocation is determined, the same or different processor circuit 130 can encode the earliest-received frame $F1_{n-3}$ according to the allocation as-determined.

Following the example of FIG. 5, as the frame-based data 101 continues to flow to the first data input 110, the look-ahead buffer circuit 120 and the processor circuit 130 can transition to storing and processing, respectively, a portion of a new or subsequent group of frames, such as can have an average bit rate or other constraint that differs from the first group of frames F1. In the example of FIG. 5, a second group of frames F2 follows the first group of frames F1. The second group of frames F2 includes In frames, designated $F2_0$ through $F2_m$, and m and n can be, but are not required to be, the same value. The frames $F2_0$ through $F2_m$ in the second group of frames F2 can have respective corresponding bit requests or constraints, which are designated $R_{F2:0}$ through $R_{F2:m}$. In an example, a sync frame, header information, or other metadata associated with or appurtenant to one of the first or second groups of frames F1 or F2 can indicate the transition to the look-ahead buffer circuit 120 and/or to the processor circuit 130.

Figure 6:
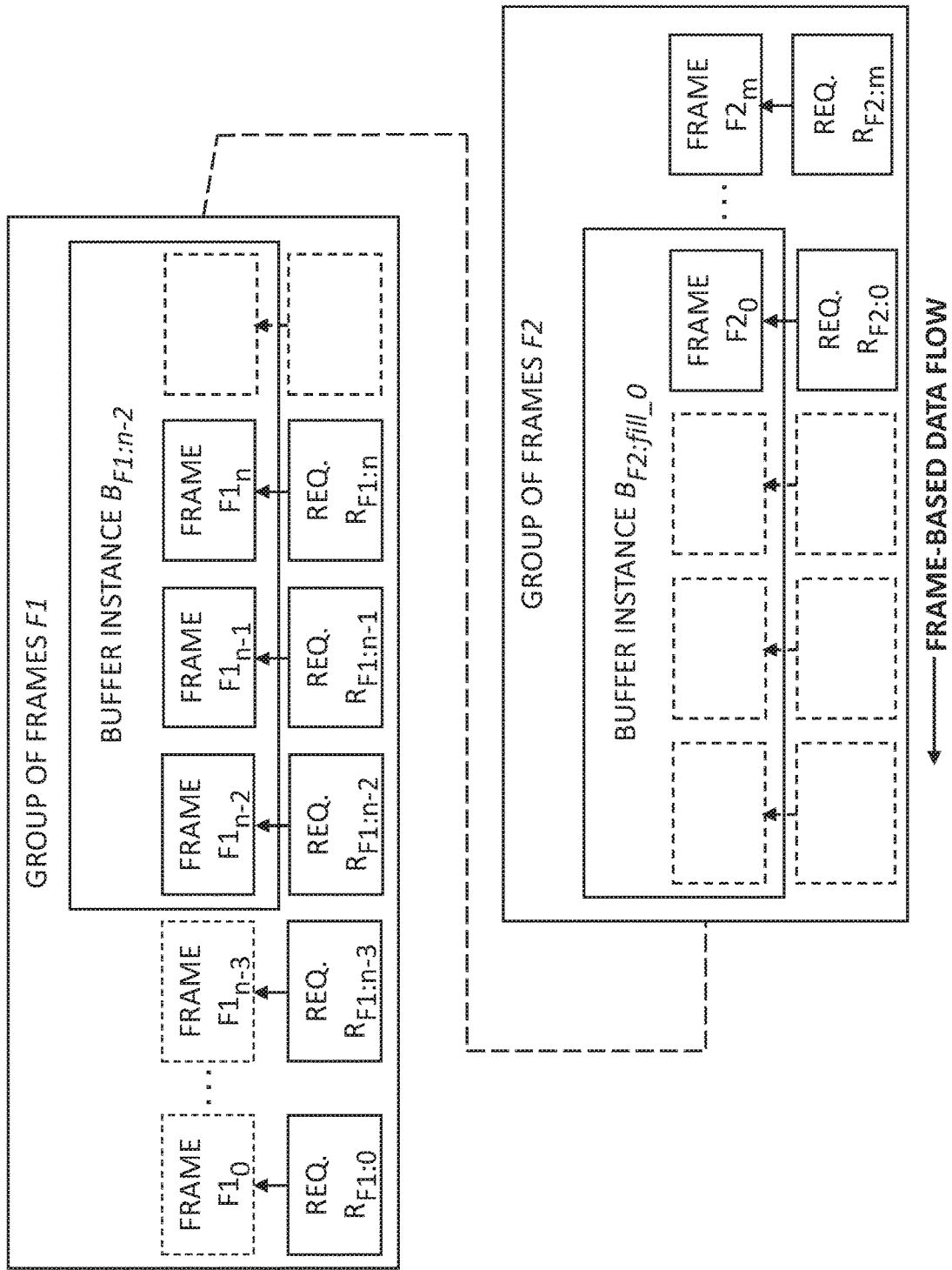
FIG. 6 illustrates generally an example that includes a beginning of a transition from processing the first group of frames F1 to processing the second group of frames F2.

FIG. 6 illustrates generally an example that includes a beginning of a transition from processing the first group of frames F1 to processing the second group of frames F2. In the example of FIG. 6, a further subsequent buffer instance $B_{F1:n-2}$ for the look-ahead buffer circuit 120 includes fewer frames than can be otherwise stored in the look-ahead buffer circuit 120. That is, for the case where the first group of frames F1 includes n frames, the example of FIG. 6 corresponds to the look-ahead buffer circuit 120 being occupied by three instead of four frames in the first group of frames F1. In the example of FIG. 6, frame $F1_{n-3}$ is purged from the look-ahead buffer circuit 120 (or the look-ahead window corresponding to the look-ahead buffer circuit 120 is moved), and the further subsequent buffer instance $B_{F1:n-2}$ includes frames $F1_{n-2}$ through $F1_n$. That is, an earliest-received frame in the subsequent buffer instance $B_{F1:n-2}$ is frame $F1_{n-2}$ and a most recently-received frame in the subsequent buffer instance $B_{F1:n-2}$ is frame $F1_n$, in this case, corresponding to the final frame in the first group of frames F1. The representation of the preceding frames $F1_0$ through $F1_{n-3}$ in the example include a dashed-line border to indicate that the frames are already processed or encoded, and the bit requests corresponding to the frames $F1_0$ through $F1_{n-3}$ can thus be disregarded for processing or encoding of further frames in the first group of frames F1.

In the example of FIG. 6, based on the information in the several bit requests $R_{F1:n-2}$ through $R_{F1:n}$, such as corresponding respectively to the frames $F1_{n-2}$ through $F1_n$, the processor circuit 130 can determine how to allocate available bits among one or more of the corresponding frames $F1_{n-2}$, $F1_{n-1}$, and $F1_n$. That is, the processor circuit 130 can determine the allocation for one or more of the frames when the look-ahead buffer circuit 120 is less than full. In an example, the processor circuit 130 is configured to determine a bit allocation for the earliest-received frame (e.g., frame $F1_{n-2}$ in the example of FIG. 6) that is presently in the look-ahead buffer circuit 120, such as based on the information in the bit requests $R_{F1:n-2}$ through $R_{F1:n}$ corresponding to the frames in the present buffer instance $B_{F1:n-2}$. Once the bit allocation is determined, the same or different processor circuit 130 can encode the earliest-received frame $F1_{n-2}$ according to the allocation as-determined.

FIG. 6 also illustrates how frames from the second group of frames F2 can populate another buffer instance $B_{F2:fill\_0}$. The buffer instance $B_{F1:n-2}$ and the buffer instance $B_{F2:fill\_0}$ can correspond to different portions of the same look-ahead buffer circuit 120 or can correspond to different discrete buffer circuits. However the frames are allocated among the buffers, the processor circuit 130 can be configured to process the frames separately for each of the indicated groups. That is, upon receipt of a sync frame, metadata, header data, or other received indication of a transition between groups of frames, the processor circuit 130 can be caused to process the bit requests and frame data from the different groups independently from one another.

In the example of FIG. 6, the buffer instance $B_{F2:fill\_0}$ includes a single frame, $F2_0$, corresponding to the first frame, or earliest-received frame, in the second group of frames F2. In the example, the processor circuit 130 does not yet process or encode information from the first frame $F2_0$ because the processor circuit 130 does not have a sufficient amount of bit request information available to make an informed determination about a bit rate, such as a bit rate or average bit rate that can be applied or enforced for the second group of frames F2. The processor circuit 130 can be configured to wait to process the first frame $F2_0$ at least until the look-ahead buffer circuit 120 is filled with a specified minimum number of frames from the second group of frames F2. In the example of FIG. 6, the specified minimum number of frames can be four frames, however fewer or additional frames can be specified. Although the specified minimum number of frames is four for each of the illustrated examples of the first and second groups of frames F1 and F2 in the examples of FIGS. 2-8, a different minimum number of frames can be used for different groups of frames.

Figure 7:
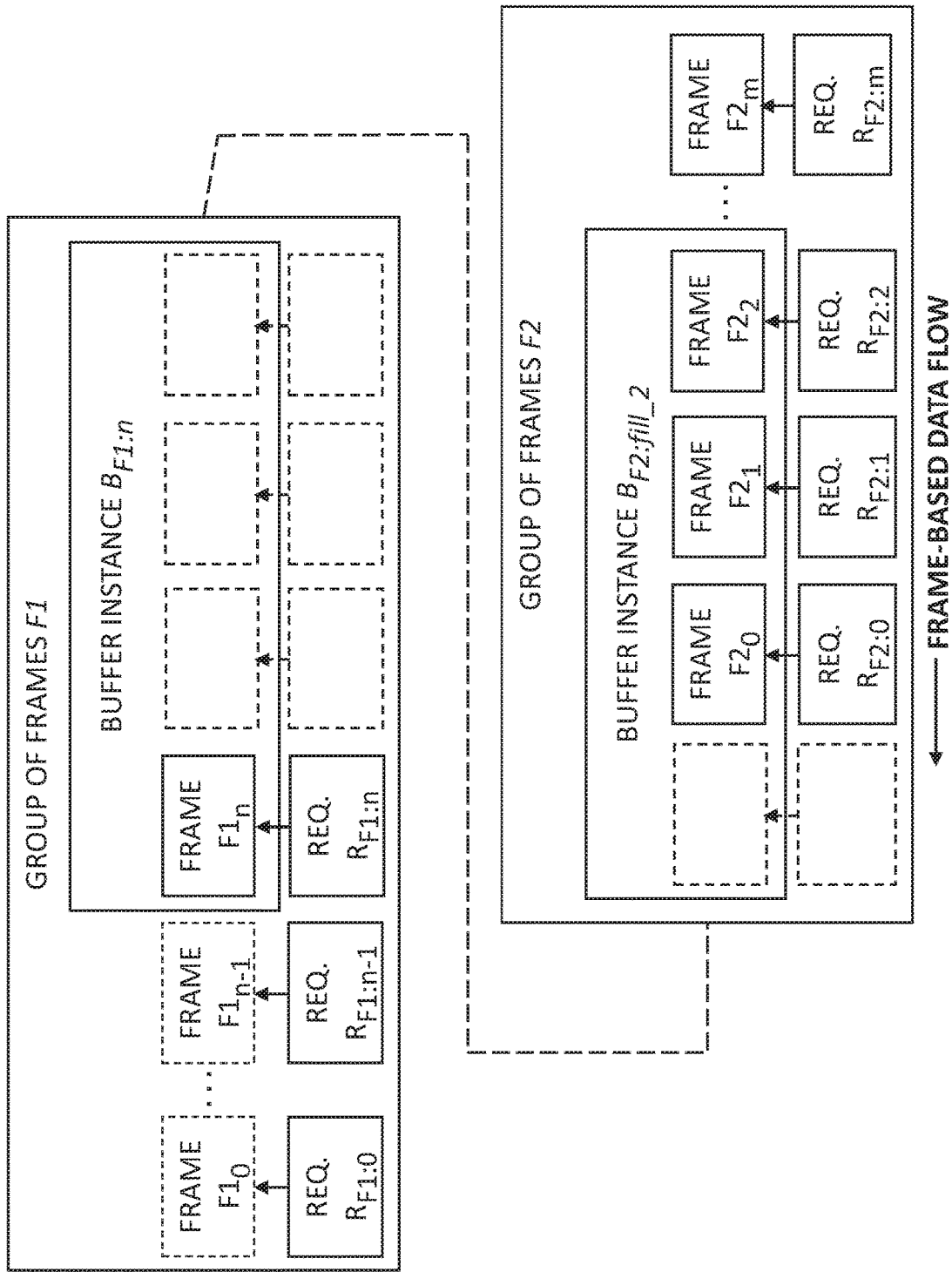
FIG. 7 illustrates generally an example that includes a continuing transition between adjacent groups of frames and a final buffer instance for the first group of frames F1.

Following the example of FIG. 6, as the frame-based data 101 continues to flow to the first data input 110, the look-ahead buffer circuit 120 and the processor circuit 130 can continue the transition between the first and second groups of frames F1 and F2. FIG. 7 illustrates generally an example that includes a continuing transition between adjacent groups of frames and a final buffer instance for the first group of frames F1. In the example of FIG. 7, a further subsequent buffer instance $B_{F1:n}$ for the look-ahead buffer circuit 120 includes fewer frames than can be otherwise stored in the look-ahead buffer circuit 120. That is, for the case where the first group of frames F1 includes n frames, the example of FIG. 7 corresponds to the look-ahead buffer circuit 120 being occupied by only the final frame $F1_n$, instead of four frames in the first group of frames F1. In the example of FIG. 7, all of the frames preceding frame F1, are purged from the look-ahead buffer circuit 120 (or the look-ahead window corresponding to the look-ahead buffer circuit 120 is moved), and the further subsequent buffer instance $B_{F1:n}$ thus includes only the final frame $F1_n$. As in the earlier examples, the representation of the preceding frames $F1_0$ through $F1_{n-1}$ in the example include a dashed-line border to indicate that the frames are already processed or encoded, and the bit requests corresponding to the frames $F1_0$ through $F1_{n-1}$ can thus be disregarded for processing or encoding of the final frame $F1_n$ in the first group of frames F1.

In an example, the processor circuit 130 can allocate any remaining bits for the first group of frames F1 to the final frame $F1_n$. In some examples, the processor circuit 130 can consider or use information in a bit request $R_{F1:n}$ that corresponds to the final frame $F1_n$ to influence an allocation of the remaining bits for the final frame $F1_n$. Once the bit allocation is determined, the same or different processor circuit 130 can encode the final frame $F1_n$ according to the allocation as-determined.

FIG. 7 also illustrates how frames from the second group of frames F2 can continue to populate another buffer instance $B_{F2:fill\_2}$. As similarly explained above in the example of FIG. 6, the buffer instance $B_{F1:n}$ and the buffer instance $B_{F2:fill\_2}$ can correspond to different portions of the same look-ahead buffer circuit 120 or can correspond to different discrete buffer circuits. Regardless of how the frames are allocated among the buffers, the processor circuit 130 can be configured to process the frames separately for each of the indicated groups.

In the example of FIG. 7, the buffer instance $B_{F2:fill\_2}$ includes some but not all of a specified minimum number of frames to start processing or encoding the data in the frames. For example, the buffer instance $B_{F2:fill\_2}$ includes three of the specified minimum four frames, $F2_0$ through $F2_2$, wherein frame $F2_0$ corresponds to the first frame, or earliest-received frame, in the second group of frames F2. In the example, the processor circuit 130 does not yet process or encode information from the first three frames in the look-ahead buffer circuit 120 because the processor circuit 130 does not have a sufficient amount of bit request information available to make an informed determination about a bit rate, such as a bit rate or average bit rate that can be applied or enforced for at least the earliest arriving frames of the second group of frames F2.

Figure 8:
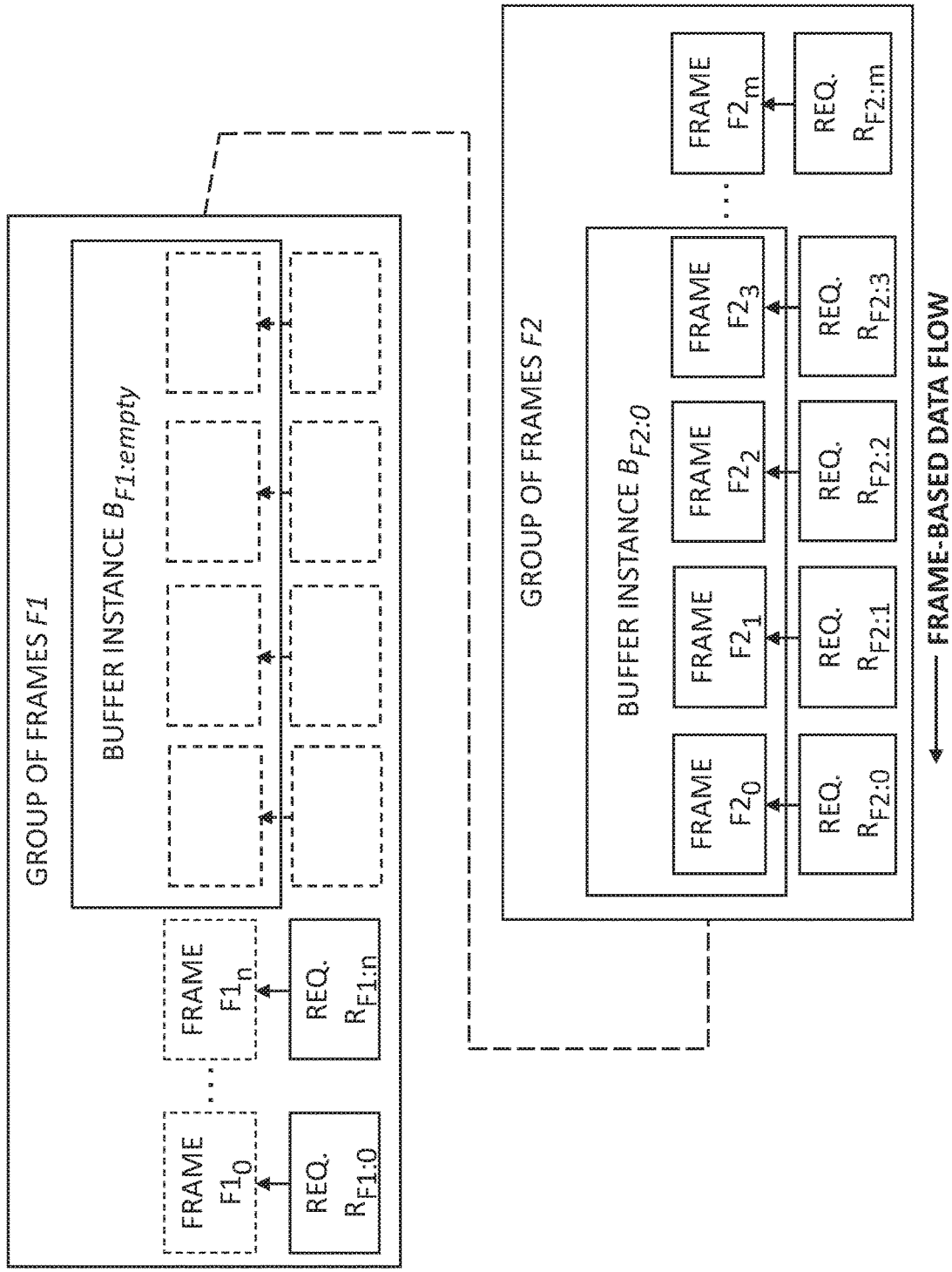
FIG. 8 illustrates generally an example that includes completing a transition from the first group of frames F1 to the second group of frames F2.

Following the example of FIG. 7, as the frame-based data 101 continues to flow to the first data input 110, the look-ahead buffer circuit 120 and the processor circuit 130 can continue the transition between the first and second groups of frames F1 and F2. FIG. 8 illustrates generally an example that includes completing a transition from the first group of frames F1 to the second group of frames F2. In the example of FIG. 8, a buffer instance $B_{F1:empty}$ is illustrated to indicate that none of the frames from the first group of frames F1 are included in the look-ahead buffer circuit 120. In the example of FIG. 8, all of the frames from the first group of frames F1 are purged from the look-ahead buffer circuit 120 (or the look-ahead window corresponding to the look-ahead buffer circuit 120 is moved), and the next buffer instance corresponds to a subsequent group of frames. Similarly to the earlier examples, the representation of the processed frames $F1_0$ through $F1_n$ in the figure include a dashed-line border to indicate that the frames are already processed or encoded, and the bit requests corresponding to the frames $F1_0$ through $F1_n$ can thus be disregarded for processing or encoding of further frames.

In the example of FIG. 8, the second group of frames F2 includes m frames, and the first four frames populate a first buffer instance $B_{F2:0}$ for the look-ahead buffer circuit 120. In other words, the first buffer instance $B_{F2:0}$ refers to a state of the look-ahead buffer circuit 120 when first through fourth frames $F2_0$, $F2_1$, $F2_2$, and $F2_3$ of the second group of frames F2 are stored in or are available to the look-ahead buffer circuit 120.

In the example of FIG. 8, for ease of illustrating the processing and frame-handling techniques described herein, the look-ahead buffer circuit 120 includes four memory locations. More or fewer memory locations can similarly be used. In the example of FIG. 8, each of the four memory locations in the look-ahead buffer circuit 120 is occupied. Therefore, the look-ahead buffer circuit 120 can be considered full and the processor circuit 130 can receive the bit requests $R_{F2:0}$ through $R_{F2:3}$ corresponding to the frames in the look-ahead buffer circuit 120. Based on the information in the several bit requests $R_{F2:0}$ through $R_{F2:3}$, the processor circuit 130 can determine how to allocate available bits among one or more of the corresponding frames $F2_0$, $F2_1$, $F2_2$, and $F2_3$. In an example, the processor circuit 130 is configured to determine a bit allocation for the earliest-received frame $F2_0$ that is present in the look-ahead buffer circuit 120, such as based on the information in the bit requests $R_{F2:0}$ through $R_{F2:3}$. In other words, the processor circuit 130 can use information or bit requests associated with each of the multiple frames in the look-ahead buffer circuit 120 to determine or provide a bit allocation for a particular frame (e.g., an earliest-received frame) in the look-ahead buffer circuit 120.

Figure 9:
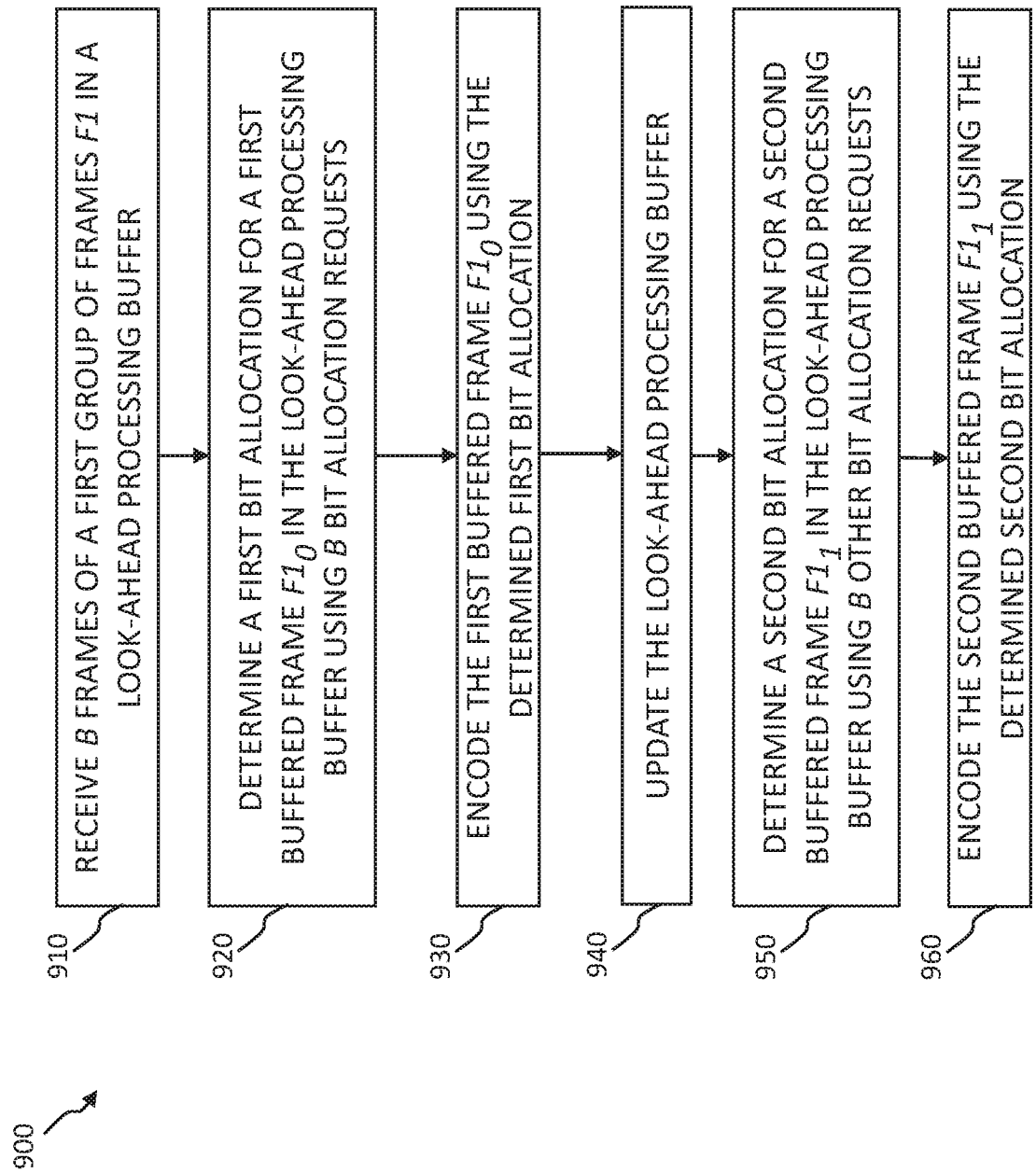
FIG. 9 illustrates generally an example of a method that can include determining respective bit allocations for different frames in a group of frames.

FIG. 9 illustrates generally an example of a method 900 that can include determining respective bit allocations for different frames in a group of frames. The method 900 can be performed using one or more components of the processing arrangement 100 from the example of FIG. 1, or using various hardware from the example of FIG. 10. In the example of the method 900, at operation 910, the look-ahead buffer circuit 120 can receive B frames, such as from a first group of frames F1. In an example, the first group of frames comprises about 50 to 100 frames, such as corresponding to about a second of audio data, and the look-ahead buffer circuit 120 is configured to receive information corresponding to about 20 frames. The example sizes of the groups of frames and of the available memory locations in the look-ahead buffer circuit 120 are provided for illustration only and fewer or additional frames or memory locations can similarly be used. Generally, however, the number of frames in a given group of frames exceeds a number of available memory locations in the look-ahead buffer circuit 120. Following the convention used here, the frames in the first group of frames F1 can be designated $F1_0$ through $F1_n$. In the example at operation 910, the look-ahead processing buffer can include, for example, frames $F1_0$ through $F1_B$. Other frames could similarly be used.

In the example 900, at 920, the processor circuit 130 can be configured to determine a bit allocation for a first buffered frame $F1_0$ in the look-ahead processing buffer, or the look-ahead buffer circuit 120. In an example, the processor circuit 130 can be configured to receive respective bit request information for each of the frames in the look-ahead processing buffer, including frames $F1_0$ through $F1_B$. The processor circuit 130 can then determine an appropriate bit allocation for the earliest frame, $F1_0$, based on the information about the several bit requests. The processor circuit 130 can determine the bit allocation based on, among other things, a relative perceptual importance of the information in the earliest frame $F1_0$ and a target average bit rate for the group of frames to which the earliest frame $F1_0$ belongs. That is, the processor circuit 130 can be configured to maintain a bit budget by allocating or withholding bits from being made available to encode the earliest frame $F1_0$. At operation 930, the same or different processor circuit used to perform the bit allocation can be used to encode the earliest frame $F1_0$ based on the bit allocation determined at operation 920.

At operation 940, the example can include updating the look-ahead processing buffer. For example, information in the look-ahead processing buffer can be coordinated in a first-in-first-out manner. That is, an earliest received frame, such as $F1_0$, can be purged, and a subsequent frame, such as $F1_{B+1}$, can take the place of the purged frame. Following the frame exchange, the look-ahead processing buffer can again include B frames, including a second frame F1 through frame F1$_{B+1}$. In an example, only a single frame is purged at each interval, however, the present inventors contemplate other embodiments wherein multiple frames can receive bit allocation determinations and can be exchanged from the buffer in a single interval.

At operation 950, the example can include determining a second bit allocation, such as for the second frame F11 in the look-ahead processing buffer. That is, at 950, the processor circuit 130 can be configured to determine a bit allocation for a second buffered frame F1$_1$ in the look-ahead processing buffer, or the look-ahead buffer circuit 120. In an example, the processor circuit 130 can be configured to receive respective bit request information for each of the frames in the look-ahead processing buffer, including frames F1$_1$ through F1$_{B+1}$, and the processor circuit 130 can then determine an appropriate bit allocation for the second frame F1$_1$ (e.g., corresponding to the earliest-received frame that is currently in the buffer) based on the information about the several bit requests. At operation 960, the same or different processor circuit used to perform the bit allocation determination at operation 950 can be used to encode the second frame F1$_1$ based on the bit allocation determined at operation 950.

This following discussion provides a formulation for a target bit rate guarantee in a variable bit rate buffer model. The discussion demonstrates that there exists a per-frame bit distribution that satisfies various constraints while achieving a specified average bit rate. Further included is an algorithm to calculate one such distribution, such as with consideration for bit requests from an encoder. Throughout the following discussion, the following notations are used:

R target bit rate
R$_{max}$ maximum instantaneous bit rate
D encoder look-ahead
n index over N frames within a Group of Frames (GoF)
S(n) bit reservoir size
H(n) overhead bits (header plus metadata)
M(n) requested minimum bits per frame
B(n) bits assigned to a frame Target Rate Guarantee
Given R, R$_{max}$, H(n)≥0 and M(n)≥0 which satisfy $$R_{max} \geq R \geq H(n) + M(n)$$

there exists a bit distribution B(n) such that $$R_{max} \geq B(n) + M(n)$$

which guarantees a target rate R over a set of N frames. With every new frame n=1 . . . N, a bit reservoir can be updated by adding R bits so the reservoir bit-inflow I$_s$ is $$I_S = NR$$

And the reservoir bit-outflow O$_s$ over the N frames is $$O_s = \sum_{n=1}^{N} [H(n) + B(n)]$$

In an example, I$_s$=O$_s$, that is, the average bit rate R over N frames, as desired.

First Encoded Frame (n=1)

In an example, a VBR model operates on a set of D frames, taking advantage of an encoder look-ahead (e.g., information in the look-ahead buffer circuit 120). The bit reservoir size can be initially calculated as $$S(1) = \sum_{k=1}^{D} [R - H(k)]$$

Since R$_{max}$≥R and R−H(k)≥M(k), $$DR_{max} \geq S(1) \geq \sum_{k=1}^{D} M(k)$$

In an example, there exists a set of b$_1$(k) such that R$_{max}$≥b$_1$(k)≥M(k) and $$S(1) = \sum_{k=1}^{D} b_1(k)$$

To illustrate this, set b$_1$(k)=R$_{max}$ if $$S(1) = DR_{max}$$

or set b$_1$(k)=M(k) if $$S(1) = \sum_{k=1}^{D} b_1(k)$$

or set b$_1$(k) to in-between values otherwise. In an example, for any S(n), n>1, there exists a set b$_n$(k) such that $$S(n) = \sum_{k=1}^{D} b_n(k)$$

subject to $$R_{max} \geq b_n(k) \geq M(n+k-1)$$

The bits assigned to the encoded frame n can be specified as $$B(n) = b_n(1)$$

which satisfies the initial constraint R$_{max}$≥B(n)≥M(n).

Frames Within the Group of Frames (n>1)

For frames within a given Group of Frames, S(n) can be designated as $$S(n) = S(n-1) - B(n-1) + R - H(n+D-1)$$

which reflects B(n−1) bits used by the encoder and adding R−H(n+D−1) bits for a new frame. Since $$S(n-1) = \sum_{k=1}^{D} b_{n-1}(k) \text{ and } B(n-1) = b_{n-1}(1)$$

there is $$S(n-1) - B(n-1) = \sum_{k=2}^{D} b_{n-1}(k)$$

For R$_{max}$≥b$_n$(k)≥M(n+k−1) so $$(D-1)R_{max} \geq S(n-1) - B(n-1) \geq \sum_{k=n}^{n+D-2} M(k)$$

there is $$R_{max} \geq R - H(n+D-1) \geq M(n+D-1)$$

and therefore $$DR_{max} \geq S(n) \geq \sum_{k=n}^{n+D-1} M(k)$$

Thus there exists $b_n(k)$ such that $$S(n) = \sum_{k=1}^{D} b_n(k)$$

and $R_{max} \geq b_n(k) \geq M(n+k-1)$.

Group of Frames Ending ($n > N-D+1$)

When the look-ahead buffer size D extends beyond the end of the Group of Frames, $S(n)$ can be provided as $$S(n) = S(n-1) - B(n-1)$$

That is, at the end of the Group of Frames, $R-H(n+D-1)$ is not added as the allowed look-ahead cannot extend beyond the Group of Frames. Accordingly, $$(N-n+1) \cdot R_{max} \geq S(n) \geq \sum_{k=n}^{N} M(k) \text{ and}$$

$$S(n) = \sum_{k=1}^{N-n+1} b_n(k)$$

with $R_{max} \geq b_n(k) \geq M(n+k-1)$.

Average Bit Rate

Note that $B(n)=b_n(1)$, $S(N)=B(N)$ and $S(N+1)=S(N)-B(N)=0$. If all components added to and subtracted from the bit reservoir are summed, from $S(1)$ through $S(N+1)$, there is $$\sum_{n=1}^{N} [R - H(n) - B(n)] = 0$$

which gives $$NR = \sum_{n=1}^{N} [H(n) + B(n)] \text{ and}$$

$$I_s = O_s$$

resulting in the Group of Frames average bit rate of R, as desired.

Bit Distribution

A guarantee of the Group of Frames target rate R was shown by updating the bit reservoir as $$S(n) = \sum_{k=n}^{D} [R - H(k)] \qquad \text{for } n = 1$$

$$S(n) = S(n-1) - B(n-1) + R - H(n+D-1) \quad \text{for } n \leq N-D+1$$

$$S(n) = S(n-1) - B(n-1) \qquad \text{for } n \leq N$$

and setting $$B(n) = b_n(1)$$

where $$S(n) = \sum_{k=1}^{\min(D, N-n+1)} B_n(k)$$

is subject to $$R_{max} \geq b_n(k) \geq M(n+k-1)$$

so that, as required, $$R_{max} \geq B(n) \geq M(n)$$

The set of $b_n(k)$ values can be determined as follows. $B(n)$ can be derived such that the values reflect a relative distribution of certain encoder-specified values $V(n)$ (which can be interpreted as encoder "bit requests"). In an example, the following can be used to obtain $B(n)$, $n=1 \ldots N$:

Set the initial $b_n(k)$, $k=1 \ldots \min(D, N-n+1)$, as $$b_n(k) = \text{round}\left(S(n) \frac{V(n+k-1)}{V_{sum}(n)}\right)$$

where $$V_{sum}(n) = \sum_{i=n}^{\min(n+D-1, N)} V(i)$$

This equates $b_n(k)$ to the normalized values $V(n+k-1)$ such that $$\sum_{k} b_n(k) \approx S(n)$$

When $R_{max}$ and $M(n)$ constraints are imposed:

$$b_n(k) = \min(R_{max}, b_n(k))$$

$$b_n(k) = \max(M(n+k-1), b_n(k))$$

and a bit over-shoot or under-shoot can be determined with respect to $S(n)$ $$\Delta_b = S(n) - \sum_{k} b_n(k)$$

In an example, iteratively add to (or remove from) $b_n(k)$ individual bits until $\Delta_b = 0$, such as in a circular loop over k. The bits are added to those $b_n(k)$ for which $$R_{max} > b_n(k)$$

or removed from those for which $$b_n(k) > M(n+k-1)$$

This process is guaranteed to converge since, as shown in the previous section, for every n there exists a set $b_n(k)$ such that $$S(n) - \sum_k b_n(k)$$

subject to $R_{max} \geq b_n(k) \geq M(n+k-1)$. Finally, $B(n)=b_n(1)$ and remaining values $b_n(k)$, $k>1$ can be discarded (these can be recalculated in the following frame as $b_{n+1}(k)$ over an updated range of V(k)).

Simulation

A simulation was performed to illustrate how to perform the processing while maintaining a constant look-ahead of D frames when switching or transitioning between groups of frames. To achieve a transition, two values of the reservoir size $S_0(n)$ and $S_1(n)$ are maintained during the transition region when the D look-ahead frames span the group of frames boundaries.

In an example, the simulation can include the encoder configured to use fewer bits than initially assigned to a frame n, $B(n) \geq B_{enc}(n)$, and the bit reservoir S(n) can be updated with the value of bits actually used, $B_{enc}(n-1)$, so that the unused bits by design become part of a new $b_n(k)$ bit distribution. In this case, $$S(n) - \sum_k b_n(k)$$

and, in the end, $R \geq R_{enc}$, where $R_{enc}$ is the effective average bit rate. Since the primary constraint is to not exceed the target bit rate, the requirements are satisfied.

In an example, more bits can be assigned to $b_n(1)$ than previously. In an example, the bits can be "borrowed" from the look-ahead frames, if possible $$b_n(1) = b_n(1) + \min\left(B_\Delta, \sum_{k=2}^{min(D,N-n+1)} [b_n(k) - M(n+k-1)]\right)$$

where $B_\Delta$ specifies a maximum number of bits permitted to be borrowed. It is verified that such borrowing does not lead to exceeding the maximum instantaneous bit-rate $b_n(1)$=min $(R_{max}, b_n(1))$. In this example, the requirement to $R_{max} \geq b_n(k) \geq M(n+k-1)$ can be maintained.

Various systems and machines can be configured to perform or carry out one or more of the signal processing or frame storage or frame processing tasks described herein. For example, any one or more of the bit request analysis, bit allocation, and encoding processing modules or processor circuits, or other modules or processes, can be implemented using a general-purpose machine or using a special, purpose-built machine that performs the various processing tasks, such as using instructions retrieved from a tangible, non-transitory, processor-readable medium.

Figure 10:
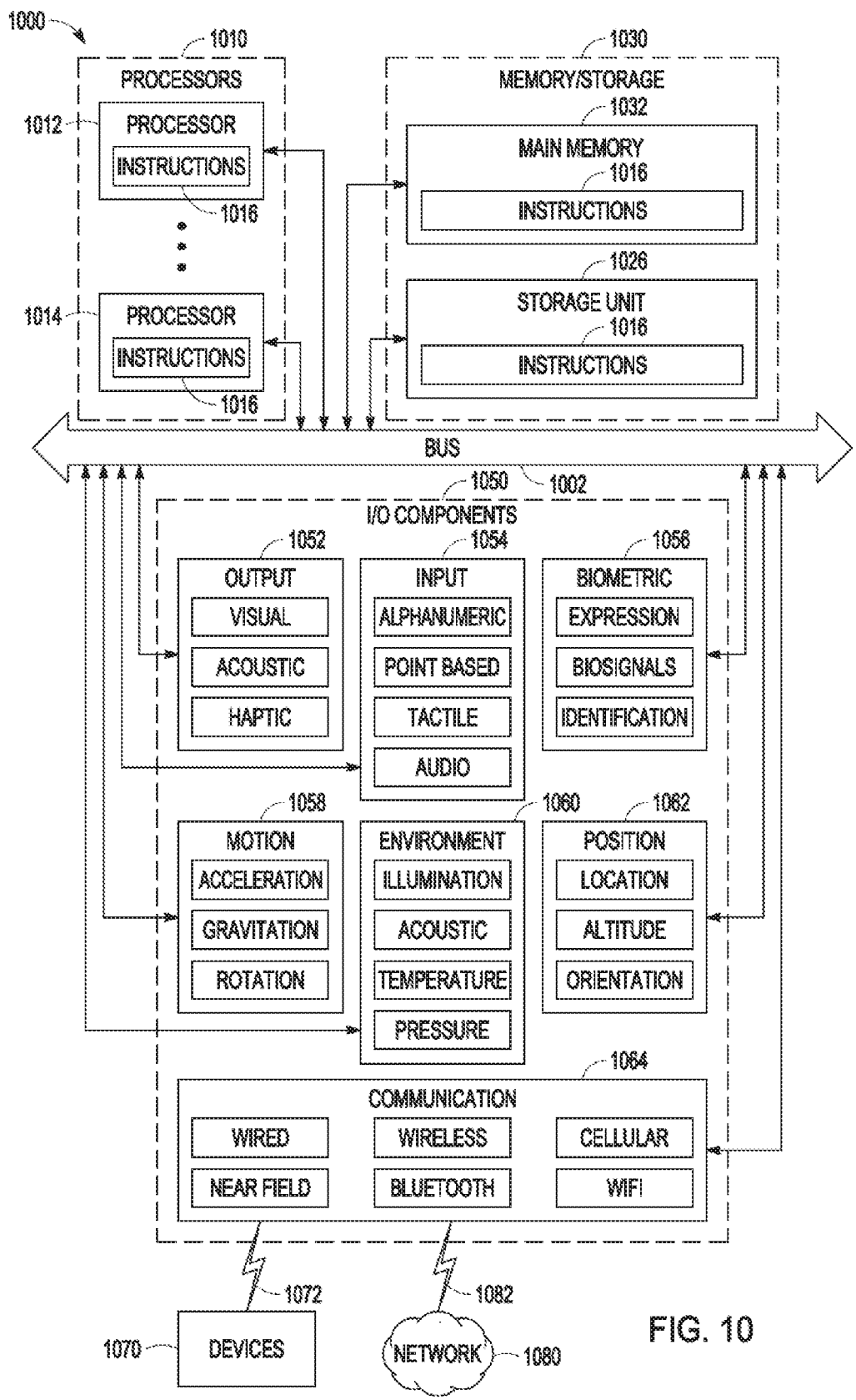
FIG. 10 is a block diagram illustrating components of a machine that can be configured to perform any one or more of the methodologies discussed herein.

FIG. 10 is a block diagram illustrating components of a machine 1000, according to some example embodiments, able to read instructions 1016 from a machine-readable medium (e.g., a machine-readable storage medium) and perform any one or more of the methodologies discussed herein. Specifically, FIG. 10 shows a diagrammatic representation of the machine 1000 in the example form of a computer system, within which the instructions 1016 (e.g., software, a program, an application, an apples, an app, or other executable code) for causing the machine 1000 to perform any one or more of the methodologies discussed herein may be executed. For example, the instructions 1016 can implement one or more of the modules or circuits or components of FIG. 1, such as can be configured to carry out the processing or encoding illustrated in the examples of FIGS. 2-9. The instructions 1016 can transform the general, non-programmed machine 1000 into a particular machine programmed to carry out the described and illustrated functions in the manner described (e.g., as an audio processor circuit). In alternative embodiments, the machine 1000 operates as a standalone device or can be coupled (e.g., networked) to other machines. In a networked deployment, the machine 1000 can operate in the capacity of a server machine or a client machine in a server-client network environment, or as a peer machine in a peer-to-peer (or distributed) network environment.

The machine 1000 can comprise, but is not limited to, a server computer, a client computer, a personal computer (PC), a tablet computer, a laptop computer, a netbook, a set-top box (STB), a personal digital assistant (PDA), an entertainment media system or system component, a cellular telephone, a smart phone, a mobile device, a wearable device (e.g., a smart watch), a smart home device (e.g., a smart appliance), other smart devices, a web appliance, a network router, a network switch, a network bridge, a headphone driver, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include or use processors 1010, such as including an audio processor circuit, non-transitory memory/storage 1030, and I/O components 1050, which can be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, a circuit such as a processor 1012 and a processor 1014 that may execute the instructions 1016. The term "processor" is intended to include a multi-core processor 1012, 1014 that can comprise two or more independent processors 1012, 1014 (sometimes referred to as "cores") that may execute the instructions 1016 contemporaneously. Although FIG. 10 shows multiple processors 1010, the machine 1000 may include a single processor 1012, 1014 with a single core, a single processor 1012, 1014 with multiple cores (e.g., a multi-core processor 1012, 1014), multiple processors 1012, 1014 with a single core, multiple processors 1012, 1014 with multiples cores, or any combination thereof, wherein any one or more of the processors can include a circuit configured to encode audio and/or video signal information, or other data.

The memory/storage 1030 can include a memory 1032, such as a main memory circuit, or other memory storage circuit, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the cache memory of processor 1012, 1014), or any suitable combination thereof, during execution thereof by the machine 1000. Accordingly, the memory 1032, the storage unit 1036, and the memory of the processors 1010 are examples of machine-readable media. In an example, the memory/storage 1030 comprises the look-ahead buffer circuit 120 or one or more instances thereof.

As used herein, "machine-readable medium" means a device able to store the instructions 1016 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped by functionality merely for simplifying the following discussion, and the grouping is in no way limiting. In various example embodiments, the I/O components 1050 may include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., loudspeakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1050 can include biometric components 1056, motion components 1058, environmental components 1060, or position components 1062, among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like, such as can influence an inclusion, use, or selection of a listener-specific or environment-specific filter that can influence a perceptual importance of data in a particular frame or group of frames, for example. The motion components 1058 can include acceleration sensor components (e.g., accelerometer), gravitation sensor components, rotation sensor components (e.g., gyroscope), and so forth, such as can be used to track changes in a location of a listener, such as can be further considered by the processor in determining how to encode particular frame data. The environmental components 1060 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect reverberation decay times, such as for one or more frequencies or frequency bands), proximity sensor or room volume sensing components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 can include communication components 1064 operable to couple the machine 1000 to a network 1080 or devices 1070 via a coupling 1082 and a coupling 1072 respectively. For example, the communication components 1064 can include a network interface component or other suitable device to interface with the network 1080. In further examples, the communication components 1064 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 can be another machine or any of a wide variety of peripheral devices (e.g., a peripheral device coupled via a USB).

Moreover, the communication components 1064 can detect identifiers or include components operable to detect identifiers. For example, the communication components 1064 can include radio frequency identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF49, Ultra Code, UCC RSS-2D bar code, and other optical codes), or acoustic detection components (e.g., microphones to identify tagged audio signals). In addition, a variety of information can be derived via the communication components 1064, such as location via Internet Protocol (IP) geolocation, location via Wi-Fi® signal triangulation, location via detecting an NFC beacon signal that may indicate a particular location, and so forth. Such identifiers can be used to determine information about one or more of a reference or local impulse response, reference or local environment characteristic, or a listener-specific characteristic.

In various example embodiments, one or more portions of the network 1080, such as can be used to transmit encoded frame data or frame data to be encoded, can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 can include a wireless or cellular network and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 can be transmitted or received over the network 1080 using a transmission medium via a network interface device (e.g., a network interface component included in the communication components 1064) and using any one of a number of well-known transfer protocols (e.g., hypertext transfer protocol (HTTP)). Similarly, the instructions 1016 can be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Many variations of the concepts and examples discussed herein will be apparent to those skilled in the relevant arts. For example, depending on the embodiment, certain acts, events, or functions of any of the methods, processes, or algorithms described herein can be performed in a different sequence, can be added, merged, or omitted (such that not all described acts or events are necessary for the practice of the various methods, processes, or algorithms). Moreover, in some embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To illustrate this interchangeability of hardware and software, various components, blocks, modules, and process actions are, in some instances, described generally in terms of their functionality. Whether such functionality is implemented as hardware or software depends upon the particular application and design constraints imposed on the overall system. The described functionality can thus be implemented in varying ways for a particular application, but such implementation decisions should not be interpreted as causing a departure from the scope of this document. Embodiments of the bit rate guarantee processing and methods and techniques described herein are operational within numerous types of general purpose or special purpose computing system environments or configurations, such as described above in the discussion of FIG. 10.

Various aspects of the invention can be used independently or together. For example, Aspect 1 can include or use subject matter (such as an apparatus, a system, a device, a method, a means for performing acts, or a device readable medium including instructions that, when performed by the device, can cause the device to perform acts), such as can include or use a method for processing data from a sequential series of groups of frames to achieve a target average processing bit rate for a particular group of frames in the series, the series including a first group of frames F1 through a last group of frames Fj, wherein each group of frames comprises Dj frames. In Aspect 1, the method can include receiving B1 frames of the first group of frames F1 in a look-ahead processing buffer, the received frames including a first buffered frame $F1_0$ through frame $F1_{B1-1}$, wherein B1 is greater than 1, and determining, using a processor circuit, a first bit allocation for the first buffered frame $F1_0$ based on one or more bit allocation requests corresponding to the received B1 frames in the look-ahead processing buffer. In an example, Aspect 1 can include receiving, in the look-ahead processing buffer, a last frame $F1_{D1-1}$ of the first group of frames F1 to be encoded, and determining, using the processor circuit, a subsequent bit allocation for the last frame $F1_{D1-1}$ based on fewer than B1 bit allocation requests.

Aspect 2 can include or use, or can optionally be combined with the subject matter of Aspect 1, to optionally include determining bit allocations for one or more other frames, such as preceding the last frame $F1_{D1-1}$, and then expunging frames other than the last frame from the look-ahead processing buffer. In Aspect 2, determining the subsequent bit allocation for the last frame can include using a bit allocation request corresponding to only the last frame $F1_{D1-1}$. Other bit allocation request information can similarly be used, such as allocation information that applies to a particular group of frames to which the last frame belongs.

Aspect 3 can include or use, or can optionally be combined with the subject matter of one or any combination of Aspects 1 or 2 to optionally include determining the first bit allocation for the first buffered frame $F1_0$ using information about each of the B1 bit allocation requests corresponding to the received B1 frames in the look-ahead processing buffer.

Aspect 4 can include or use, or can optionally be combined with the subject matter of one or any combination of Aspects 1 through 3 to optionally include encoding, using the processor circuit, the first buffered frame $F1_0$ using the first bit allocation.

Aspect 5 can include or use, or can optionally be combined with the subject matter of one or any combination of Aspects 1 through 3 to optionally include communicating the determined first bit allocation for the first buffered frame $F1_0$ from the processor circuit to an encoder circuit, and using the encoder circuit, encoding the first buffered frame $F1_0$ using the first bit allocation.

Aspect 6 can include or use, or can optionally be combined with the subject matter of Aspect 1, to optionally include communicating the determined subsequent bit allocation for the last frame $F1_{D1-1}$ from the processor circuit to a different encoder circuit, and using the different encoder circuit, encoding the last frame $F1_{D1-1}$ using the subsequent bit allocation.

Aspect 7 can include or use, or can optionally be combined with the subject matter of one or any combination of Aspects 1 through 6 to optionally include the receiving the B1 frames of the first group of frames F1 in the look-ahead processing buffer including receiving sequential frames from the first group of frames F1.

Aspect 8 can include or use, or can optionally be combined with the subject matter of one or any combination of Aspects 1 through 7 to optionally include the receiving the B1 frames of the first group of frames F1 in the look-ahead processing buffer includes receiving B1 respective bit allocation requests for the B1 received frames.

Aspect 9 can include or use, or can optionally be combined with the subject matter of one or any combination of Aspects 1 through 8 to optionally include updating frame contents of the look-ahead processing buffer including removing or expunging the first buffered frame $F1_0$ and receiving a later frame $F1_{B1}$ such that the look-ahead processing buffer includes a second buffered frame $F1_1$ through frame $F1_{B1}$. In an example, Aspect 9 can further include determining, using the processor circuit, a bit allocation for the second buffered frame $F1_1$ based on B1 bit allocation requests corresponding to the updated frame contents of the look-ahead processing buffer.

Aspect 10 can include or use, or can optionally be combined with the subject matter of one or any combination of Aspects 1 through 9 to optionally include, before encoding the last frame $F1_{D1-1}$ from the first group of frames F1, buffering bit allocation requests for one or more frames of a subsequent second group of frames F2.

Aspect 11 can include or use, or can optionally be combined with the subject matter of Aspect 10, to optionally include storing the one or more frames of the subsequent second group of frames F2 in a different second look-ahead processing buffer.

Aspect 12 can include or use, or can optionally be combined with the subject matter of one or any combination of Aspects 1 through 11 to optionally include, before encoding the last frame from the first group of frames F1 populating a portion of a second look-ahead processing buffer with frames from a second group of frames F2, including receiving at least frame $F2_0$. The example of Aspect 12 can further include, following determining the subsequent bit allocation for the last frame $F1_{D1-1}$ from the first group of frames F1, filling the second look-ahead processing buffer with at least one additional frame of the second group of frames F2, the received frames including B2 frames $F2_0$ through $F2_{B2-1}$, wherein B2 is greater than 1, and determining, using the processor circuit, a bit allocation for the frame $F2_0$ based on B2 bit allocation requests corresponding to the received B2 frames in the second look-ahead processing buffer.

Aspect 13 can include or use, or can optionally be combined with the subject matter of one or any combination of Aspects 1 through 11 to optionally include, before encoding the last frame $F1_{D1-1}$ from the first group of frames F1, populating a portion of a second look-ahead processing buffer with frames from a second group of frames F2, including receiving at least frame $F2_0$. The example of Aspect 13 can further include, following determining the subsequent bit allocation for the last frame from the first group of frames F1, filling the second look-ahead processing buffer with at least one additional frame of the second group of frames F2, the received frames including B2 frames $F2_0$ through $F2_{B2-1}$, wherein B2 is greater than 1, and determining, using the processor circuit, a bit allocation for the frame $F2_0$ based on one or more bit allocation requests corresponding to the received B2 frames in the second look-ahead processing buffer, receiving, in the second look-ahead processing buffer, a last frame $F2_{D2-1}$ of the second group of frames F2 to be encoded, and expunging frames other than the last frame $F2_{D2-1}$ from the second look-ahead processing buffer, and determining, using the processor circuit, a bit allocation for the last frame $F2_{D2-1}$ based on fewer than B2 bit allocation requests.

Aspect 14 can include or use, or can optionally be combined with the subject matter of one or any combination of Aspects 1 through 13 to optionally include identifying a sync frame in the first group of frames F1. In Aspect 14, after or subsequent to identifying the sync frame in the first group of frames F1, the example can include buffering, in the same or different look-ahead processing buffer, bit allocation requests for frames in a subsequent second group of frames F2.

Aspect 15 can include or use, or can optionally be combined with the subject matter of one or any combination of Aspects 1 through 14 to optionally include determining one or more constraints associated with the frames in the first group of frames F1, the constraints including one or more of a maximum bit rate and a minimum bit rate.

Aspect 16 can include or use, or can optionally be combined with the subject matter of Aspect 15, to optionally include determining a constraint that applies to multiple ones of the frames in the first group of frames F1.

Aspect 17 can include or use, or can optionally be combined with the subject matter of Aspect 15, to optionally include determining respective constraints for each of the frames in the first group of frames F1.

Aspect 18 can include or use, or can optionally be combined with the subject matter of Aspect 15, to optionally include or use determining the constraints associated with the frames in the first group of frames F1 using information from a header or metadata from one or more of the groups of frames F1 through Fj.

Aspect 19 can include or use, or can optionally be combined with the subject matter of one or any combination of Aspects 1 through 18 to optionally include the sequential series of groups of frames including the first group of frames F1 through the last group of frames Fj includes audio or video information.

Aspect 20 can include or use, or can optionally be combined with the subject matter of one or any combination of Aspects 1 through 19 to optionally include identifying a relative or absolute perceptual importance of the information in the frames of the first group of frames F1 and allocating a greater number of bits to the first frame $F1_0$ than to a subsequent second frame when a perceptual importance of information in the first frame $F1_0$ exceeds a perceptual importance of information in the second frame $F1_1$.

Aspect 21 can include or use, or can optionally be combined with the subject matter of one or any combination of Aspects 1 through 20 to optionally include a quantity of frames Dj for a given group of frames FJ is unknown to the processor circuit a priori.

Aspect 22 can include or use subject matter (such as an apparatus, a system, a device, a method, a means for performing acts, or a device readable medium including instructions that, when performed by the device, can cause the device to perform acts), such as can include or use a method for processing data from a sequential series of groups of frames, including a first group of frames F1 through a last group of frames Fj, wherein each group of frames comprises Dj frames, including a first frame $Fn_0$ through a last frame $Fn_{Dj-1}$. In an example, Aspect 22 can include receiving a first series of frames in a first buffer of size B frames, the first series of frames including frames $F1_0$ through $F1_{B-1}$ from the first group of frames F1, and encoding a first frame $F1_0$ of the first group of frames F1, including receiving, at a first processor circuit, respective bit allocation requests for the first series of frames in the first buffer, the bit allocation requests based on constraints associated with the first series of frames in the first buffer, determining, using the first processor circuit, a first bit allocation for the first frame $F1_0$ based on at least one of the constraints, and encoding the first frame $F1_0$ using the determined first bit allocation for the first frame $F1_0$. Aspect 22 can further include updating the first buffer to include a second series of frames, the second series of frames including frames $F1_1$ through $F1_B$ from the first group of frames F1, and encoding a second frame $F1_1$ of the first group of frames F1, including receiving, at the first processor circuit, respective bit allocation requests for the second series of frames in the updated first buffer, the bit allocation requests based on constraints associated with the second series of frames in the updated first buffer, determining, using the first processor circuit, a second bit allocation for the second frame $F1_1$ based on at least one of the constraints, and encoding the second frame $F1_1$ using the determined second bit allocation for the second frame $F1_1$.

Aspect 23 can include or use, or can optionally be combined with the subject matter of Aspect 22, to optionally include the receiving, at the first processor circuit, the respective bit allocation requests for the second series of frames includes receiving one or more of the same bit allocation requests associated with the first series of frames.

Aspect 24 can include or use, or can optionally be combined with the subject matter of one or a combination of Aspects 22 or 23, to optionally include the determining the first bit allocation for the first frame $F1_0$ includes determining the first bit allocation using information about the bit allocation requests for all of the frames in the first series of frames in the first buffer.

Aspect 25 can include or use, or can optionally be combined with the subject matter of one or any combination of Aspects 22 through 24 to optionally include the determining the first and second bit allocations for the first frame $F1_0$ and the second frame $F1_1$, respectively, includes satisfying a first target average bit rate for the first group of frames F1.

Aspect 26 can include or use, or can optionally be combined with the subject matter of Aspect 22, to optionally include determining, using the first processor circuit, bit allocations for frames in a subsequent second group of frames F2, wherein the determining includes satisfying a different second target average bit rate for the second group of frames F2.

Aspect 27 can include or use, or can optionally be combined with the subject matter of one or any combination of Aspects 22 through 26 to optionally include the receiving the respective bit allocation requests for the first series of frames in the first buffer includes receiving requests that are based on constraints that include one or more of a minimum bit rate and a maximum bit rate.

Aspect 28 can include or use, or can optionally be combined with the subject matter of one or any combination of Aspects 22 through 27 to optionally include the determining the first and second bit allocations for the first frame $F1_0$ and the second frame $F1_1$, respectively, includes allocating the bits based on a relative perceptual importance of information in the first frame $F1_0$ and the second frame $F1_1$.

Aspect 29 can include or use subject matter (such as an apparatus, a system, a device, a method, a means for performing acts, or a device readable medium including instructions that, when performed by the device, can cause the device to perform acts), such as can include or use a system for processing data from a sequential series of groups of frames to achieve a target average processing bit rate for a particular group of frames in the series, the series including a first group of frames F1 through a last group of frames Fj, wherein each group of frames comprises Dj frames. In an example, the system of Aspect 29 can include or use a look-ahead buffer circuit configured to receive B1 frames of the first group of frames F1, the received frames including a first buffered frame $F1_0$ through frame $F1_{B1-1}$, wherein B1 is greater than 1, a bit allocation processor circuit, coupled to the look-ahead buffer circuit, the bit allocation processor circuit configured to determine a first bit allocation for the first buffered frame $F1_0$ based on the bit allocation requests corresponding to the received B1 frames in the look-ahead processing buffer, and an encoder circuit configured to encode the first buffered frame $F1_0$ using the determined first bit allocation.

Aspect 30 can include or use, or can optionally be combined with the subject matter of Aspect 29, to optionally include or use the look-ahead buffer circuit configured to receive new frames from the first group of frames F1 and expunge old frames from the first group of frames F1 in a first-in-first-out manner.

Aspect 31 can include or use, or can optionally be combined with the subject matter of one or a combination of Aspects 29 or 30, to optionally include the bit allocation processor circuit configured to determine a bit allocation for a second buffered frame $F1_1$ based on bit allocation requests corresponding to B1 frames, $F1_1$ through $F1_{B1}$, in the look-ahead processing buffer.

Aspect 32 can include or use, or can optionally be combined with the subject matter of one or any combination of Aspects 29 through 31 to optionally include the bit allocation processor circuit configured to determine the first bit allocation based on constraints associated with one or more frames in the first group of frames F1 or in another group of frames.

Aspect 33 can include or use, or can optionally be combined with the subject matter of one or any combination of Aspects 29 through 32 to optionally include the bit allocation processor circuit configured to determine the first bit allocation based on a relative perceptual importance characteristic of the first, buffered frame $F1_0$ with respect to other frames in the first group of frames F1.

Aspect 34 can include or use, or can optionally be combined with the subject matter of one or any combination of Aspects 29 through 33 to optionally include the look-ahead buffer circuit is configured to receive the frames as a continuous data stream arriving from a network.

Each of these non-limiting Aspects can stand on its own, or can be combined in various permutations or combinations with one or more of the other Aspects or examples provided herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made. As will be recognized, certain embodiments of the inventions described herein can be embodied within a form that does not provide all of the features and benefits set forth herein, as some features can be used or practiced separately from others.

Moreover, although the subject matter has been described in language specific to structural features or methods or acts, it is to be understood that the subject matter defined in the appended claims is not necessarily limited to the specific features or acts described above. Rather, the specific features and acts described above are disclosed as example forms of implementing the claims.

What is claimed is:

1. A method for processing data from a sequential series of groups of frames to achieve a target average processing bit rate for a particular group of frames in the series, the series including a first group of frames F1 through a last group of frames Fj, wherein each group of frames comprises Dj frames, the method comprising:
   receiving B1 frames of the first group of frames F1 in a look-ahead processing buffer, the received frames including a first buffered frame $F1_0$ through frame $F1_{B1-1}$, wherein B1 is greater than 1 and B1 is less than D1;
   determining, using a processor circuit, a first bit allocation for the first buffered frame $F1_0$ based on one or more bit allocation requests corresponding to the received B1 frames in the look-ahead processing buffer;
   receiving, in the look-ahead processing buffer, a last frame $F1_{D1-1}$ of the first group of frames F1 to be encoded; and
   determining, using the processor circuit, a subsequent bit allocation for the last frame $F1_{D1-1}$ based on fewer than B1 bit allocation requests.

2. The method of claim 1, further comprising:
   determining bit allocations for one or more other frames in the first group of frames F1 preceding the last frame $F1_{D1-1}$; and
   expunging frames other than the last frame $F1_{D1-1}$ from the look-ahead processing buffer;
   wherein the determining the subsequent bit allocation for the last frame $F1_{D1-1}$ of the first group of frames F1 includes using a bit allocation request corresponding to only the last frame $F1_{D1-1}$.

3. The method of claim 1, wherein the receiving the B1 frames of the first group of frames F1 in the look-ahead processing buffer includes receiving B1 respective bit allocation requests for the B1 received frames; and
   wherein the determining the first bit allocation for the first buffered frame $F1_0$ includes using information about each of the B1 bit allocation requests corresponding to the received B1 frames in the look-ahead processing buffer.

4. The method of claim 1, further comprising encoding, using the same or other processor circuit, the first buffered frame $F1_0$ using the first bit allocation.

5. The method of claim 1, further comprising:
   updating frame contents of the look-ahead processing buffer including removing the first buffered frame $F1_0$ and receiving a later frame $F1_{B1}$ such that the look-ahead processing buffer includes a second buffered frame $F1_1$ through frame $F1_{B1}$; and
   determining, using the processor circuit, a bit allocation for the second buffered frame $F1_1$ based on B1 bit allocation requests corresponding to the updated frame contents of the look-ahead processing buffer.

6. The method of claim 1, further comprising:
   before encoding the last frame $F1_{D1-1}$ from the first group of frames F1, buffering bit allocation requests for one or more frames of a subsequent second group of frames F2.

7. The method of claim 1, further comprising:
   before encoding the last frame $F1_{D1-1}$ from the first group of frames F1:
     populating a portion of a second look-ahead processing buffer with frames from a second group of frames F2, including receiving at least frame $F2_0$;
     following determining the subsequent bit allocation for the last frame $F1_{D1-1}$ from the first group of frames F1:
       filling the second look-ahead processing buffer with at least one additional frame of the second group of frames F2, the received frames including B2 frames $F2_0$ through $F2_{B2-1}$, wherein B2 is greater than 1; and
       determining, using the processor circuit, a bit allocation for the frame $F2_0$ based on one or more bit allocation requests corresponding to the received B2 frames in the second look-ahead processing buffer;
     receiving, in the second look-ahead processing buffer, a last frame $F2_{D2-1}$ of the second group of frames F2 to be encoded, and expunging frames other than the last frame $F2_{D2-1}$ from the second look-ahead processing buffer; and
     determining, using the processor circuit, a bit allocation for the last frame $F2_{D2-1}$ based on fewer than B2 bit allocation requests.

8. The method of claim 1, further comprising determining one or more constraints associated with the frames in the first group of frames F1, wherein the determining the one or more constraints includes one or more of:
- determining a maximum bit rate or a minimum bit rate for a particular frame or group of frames;
- determining a constraint that applies to multiple ones of the frames in the first group of frames F1; and
- determining respective constraints for each of the frames in the first group of frames F1.

9. The method of claim 1, further comprising:
- identifying a relative or absolute perceptual importance of the information in the frames of the first group of frames F1; and
- allocating a greater number of bits to the first frame $F1_0$ than to a subsequent second frame $F1_1$ when a perceptual importance of information in the first frame $F1_0$ exceeds a perceptual importance of information in the second frame $F1_1$.

10. A method for processing data from a sequential series of groups of frames, including a first group of frames F1 through a last group of frames Fj, wherein each group of frames comprises Dj frames, including a first frame $Fn_0$ through a last frame $Fn_{Dj-1}$, the method comprising:
- receiving a first series of frames in a first buffer of size B frames, the first series of frames including frames $F1_0$ through $F1_{B-1}$ from the first group of frames F1, wherein B is less than a total number of frames D1 in the first group of frames F1;
- encoding a first frame $F1_0$ of the first group of frames F1, including:
  - receiving, at a first processor circuit, respective bit allocation requests for the first series of frames in the first buffer, the bit allocation requests based on constraints associated with the first series of frames in the first buffer;
  - determining, using the first processor circuit, a first bit allocation for the first frame $F1_0$ based on at least one of the constraints associated with the first series of frames in the first buffer; and
  - encoding the first frame $F1_0$ using the determined first bit allocation for the first frame $F1_0$;
- updating the first buffer to include a second series of frames, the second series of frames including frames $F1_1$ through $F1_B$ from the first group of frames F1;
- encoding a second frame $F1_1$ of the first group of frames F1, including:
  - receiving, at the first processor circuit, respective bit allocation requests for the second series of frames in the updated first buffer, the bit allocation requests based on constraints associated with the second series of frames in the updated first buffer;
  - determining, using the first processor circuit, a second bit allocation for the second frame $F1_1$ based on at least one of the constraints associated with the second series of frames in the updated first buffer; and
  - encoding the second frame $F1_1$ using the determined second bit allocation for the second frame $F1_1$.

11. The method of claim 10, wherein the determining the first bit allocation for the first frame $F1_0$ includes determining the first bit allocation using information about the bit allocation requests for all of the frames in the first series of frames in the first buffer.

12. The method of claim 10, wherein the determining the first and second bit allocations for the first frame $F1_0$ and the second frame $F1_1$, respectively, includes satisfying a first target average bit rate for the first group of frames F1.

13. The method of claim 10, wherein the receiving the respective bit allocation requests for the first series of frames in the first buffer includes receiving requests that are based on constraints that include one or more of a minimum bit rate and a maximum bit rate.

14. The method of claim 10, wherein the determining the first and second bit allocations for the first frame $F1_0$ and the second frame $F1_1$, respectively, includes allocating the bits based on a relative perceptual importance of information in the first frame $F1_0$ and the second frame $F1_1$.

15. A system for processing data from a sequential series of groups of frames to achieve a target average processing bit rate for a particular group of frames in the series, the series including a first group of frames F1 through a last group of frames Fj, wherein each group of frames comprises Dj frames, the system comprising:
- a look-ahead buffer circuit configured to receive B1 frames of the first group of frames F1, the received frames including a first buffered frame $F1_0$ through frame $F1_{B1-1}$, wherein B1 is greater than 1 and B1 is less than D1;
- a bit allocation processor circuit, coupled to the look-ahead buffer circuit, the bit allocation processor circuit configured to determine a first bit allocation for the first buffered frame $F1_0$ based on the bit allocation requests corresponding to the received B1 frames in the look-ahead processing buffer wherein the received B1 frames include fewer than all of the frames from the first group of frames F1; and
- an encoder circuit configured to encode the first buffered frame $F1_0$ using the determined first bit allocation.

16. The system of claim 15, wherein the look-ahead buffer circuit is configured to receive new frames from the first group of frames F1 and expunge old frames from the first group of frames F1 in a first-in-first-out manner.

17. The system of claim 15, wherein the bit allocation processor circuit is configured to determine a bit allocation for a second buffered frame $F1_1$ based on bit allocation requests corresponding to B1 frames, $F1_1$ through $F1_{B1}$, in the look-ahead processing buffer.

18. The system of claim 15, wherein the bit allocation processor circuit is configured to determine the first bit allocation based on constraints associated with one or more frames in the first group of frames F1 or in another group of frames.

19. The system of claim 15, wherein the bit allocation processor circuit is configured to determine the first bit allocation based on a relative perceptual importance characteristic of the first buffered frame $F1_0$ with respect to other frames in the first group of frames F1.

20. The system of claim 15, wherein the look-ahead buffer circuit is configured to receive the frames as a continuous data stream arriving from a network.

* * * * *